(12) United States Patent
Tasaka

(10) Patent No.: US 7,924,379 B2
(45) Date of Patent: Apr. 12, 2011

(54) LIQUID CRYSTAL DISPLAY

(75) Inventor: Koji Tasaka, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 208 days.

(21) Appl. No.: 11/509,649

(22) Filed: Aug. 25, 2006

(65) Prior Publication Data

US 2007/0046872 A1    Mar. 1, 2007

(30) Foreign Application Priority Data

Aug. 30, 2005   (JP) ................................. 2005-249037

(51) Int. Cl.
*G02F 1/1335*   (2006.01)
*G02F 1/133*    (2006.01)

(52) U.S. Cl. ............ 349/118; 349/84; 349/96; 349/117; 349/119

(58) Field of Classification Search ................ 349/9, 62, 349/65, 96, 106, 112, 114–119
See application file for complete search history.

(56) References Cited

U.S. PATENT DOCUMENTS

| | | | |
|---|---|---|---|
| 3,072,585 A | 1/1963 | Milionis et al. | |
| 3,159,646 A | 12/1964 | Milionis et al. | |
| 3,399,173 A | 8/1968 | Heller et al. | |
| 3,761,272 A | 9/1973 | Mannens et al. | |
| 4,028,331 A | 6/1977 | Hotta et al. | |
| 5,683,861 A | 11/1997 | Vishwakarma et al. | |
| 5,825,543 A | 10/1998 | Ouderkirk et al. | |
| 5,867,240 A * | 2/1999 | Crawford et al. | 349/118 |
| 6,081,312 A * | 6/2000 | Aminaka et al. | 349/118 |
| 6,288,840 B1 | 9/2001 | Perkins et al. | |
| 6,628,359 B1 * | 9/2003 | Terashita et al. | 349/120 |
| 7,355,663 B2 * | 4/2008 | Saiki et al. | 349/96 |
| 2004/0036828 A1 * | 2/2004 | Aminaka et al. | 349/117 |
| 2004/0063887 A1 * | 4/2004 | Toyomasu et al. | 526/307.2 |

(Continued)

FOREIGN PATENT DOCUMENTS

EP    86300416    9/1991

(Continued)

OTHER PUBLICATIONS

Jiang et al., Functional polymers. LVI. Photochemical behavior of 2(2-hydroxyphenyl)2H-benzotriazole derivatives. 4. Spectroscopic study of ultraviolet absorbers with more than one 2(2-hydroxyphenyl)2H-benzotriazole group and more than one ortho-hydroxy group in the molecule, Polymer Bulletin V.20 (2), pp. 169-176, 1988.

(Continued)

*Primary Examiner* — Mark A Robinson
*Assistant Examiner* — Hung Lam
(74) *Attorney, Agent, or Firm* — Finnegan, Henderson, Farabow, Garrett & Dunner, L.L.P.

(57) ABSTRACT

A liquid crystal display comprising: a brightness enhancing film, polarizing plate (A), a liquid crystal cell, polarizing plate (B) laminated in that order, Wherein (i) polarizing plate (A) has a polarizing plate protective film facing the brightness enhancing film; (ii) the polarizing plate protective film is a cellulose ester film; (iii) an in-plane retardation value Ro(550) of the of the cellulose ester film represented by Formula (I) is 0 to 5 nm; and (iv) a retardation value in a thickness direction Rt(550) of the of the cellulose ester film represented by Formula (II) is −15 to 15 nm, $Ro(550) = (Nx - Ny) \times d$     Formula (I)

$Rt(550) = \{(Nx + Ny)/2 - Nz\} \times d.$     Formula (II)

6 Claims, 2 Drawing Sheets

U.S. PATENT DOCUMENTS

| | | | |
|---|---|---|---|
| 2004/0227879 A1* | 11/2004 | Elman et al. | 349/117 |
| 2004/0233363 A1* | 11/2004 | Murayama et al. | 349/117 |
| 2004/0245499 A1* | 12/2004 | Negoro et al. | 252/299.62 |
| 2006/0082703 A1* | 4/2006 | Kuzuhara et al. | 349/96 |

FOREIGN PATENT DOCUMENTS

| | | |
|---|---|---|
| JP | 59-151110 | 8/1984 |
| JP | 59-151112 | 8/1984 |
| JP | 63-185969 | 8/1988 |
| JP | 63-227575 | 9/1988 |
| JP | 1-105738 | 4/1989 |
| JP | 4-268505 | 9/1992 |
| JP | 5-197073 | 8/1993 |
| JP | 6-148430 | 5/1994 |
| JP | 8-240716 | 9/1996 |
| JP | 9-95538 | 4/1997 |
| JP | 9-95544 | 4/1997 |
| JP | 9-95557 | 4/1997 |
| JP | 2000-137115 | 5/2000 |
| JP | 2001-201635 | 7/2001 |
| JP | 2002-363420 | 12/2002 |
| JP | 2003-12823 | 1/2003 |
| JP | 2003-12859 | 1/2003 |
| JP | 2003-114333 | 4/2003 |
| JP | 2004-203009 | 7/2004 |
| JP | 2004-271846 | 9/2004 |
| JP | 2004-354699 | 12/2004 |
| JP | 2004-354828 | 12/2004 |

OTHER PUBLICATIONS

Jiang et al., Functional polymers. LVI. Photochemical behavior of 2(2-hydroxyphenyl)2H-benzotriazole derivatives. 4. Spectroscopic study of ultraviolet absorbers with more than one 2(2-hydroxyphenyl)2H-benzotriazole group and more than one ortho-hydroxy group in the molecule, Chemical Abstracts V.109, No. 191389, 1988.

The First Office Action issued by Chinese patent office, mailed on Apr. 10, 2009, in a counterpart application No. 2006800312647 and English-language translation thereof.

* cited by examiner

ARRANGEMENT DURING EVALUATION

COMPARATIVE EXAMPLE

LIQUID CRYSTAL DISPLAY

This application is based on Japanese Patent Application No. 2005-249037 filed on Aug. 30, 2005 in Japanese Patent Office, the entire content of which is hereby incorporated by reference.

FIELD OF THE INVENTION

The present invention relates to a liquid crystal display and in more detail to a liquid crystal display which enhances brightness by decreasing the loss of brightness in oblique directions.

BACKGROUND OF THE INVENTION

At present, further demanded for liquid crystal displays are lower power consumption, enhanced brightness, and an enlarged viewing angle. It is possible to enhance the brightness of a transmission type liquid crystal display by increasing the light amount of the backlight. However, problems result in which the power consumption increases, heat is generated, and the size of the liquid crystal displays increases. Another effective method to enhance the brightness is to arrange a brightness enhancing film (or a dual brightness enhancing film: DBEF) between the backlight and the polarizing plate, which is a widely employed means. Of light coming from the backlight side, the brightness enhancing film selectively transmits polarized light which transmits a polarizing plate, and the polarized light absorbed in the polarizing plate is selectively reflected and reused, whereby the brightness is enhanced due to decreased light amount which is absorbed by the polarizing plate.

At present, the polarizing plate, mainly employed in liquid crystal displays, is structured in such a manner that a polyvinyl alcohol film, serving as a polarizer, is adhered employing two sheets of triacetyl cellulose film (hereinafter referred to as TAC film). Features of the TAC film are high transparency, low retardation, and ease of adhesion to a polarizer. However, TAC film exhibits retardation specifically in the thickness direction. When the brightness enhancing film is employed, linear polarized light in the oblique direction is converted to elliptic polarized light via retardation in the thickness direction of the TAC film. Accordingly, brightness in the oblique direction is decreased due to light absorption in the polarizer. In Patent Document 1, problems of color shift are overcome by decreasing the retardation of the polarizing plate protective film via the similar constitution. However, this technique resulted in problems in which adhesion to the polarizer was insufficient due to the use of non-cellulose based thermoplastic resins, whereby the adhered polarizer easily peels off.

Further, the polarizing plate protective film on the backlight side is exposed to a high temperature to tend to result in variation and non-uniformity of the retardation, resulting in problems in which the uniformity of brightness tends to vary.

(Patent Document 1) Japanese Patent Publication Open to Public Inspection (hereinafter referred to as JP-A) No. 2004-271846

SUMMARY OF THE INVENTION

An object of the present invention is to provide a liquid crystal display in which a decrease in light utilization efficiency in the oblique direction in the liquid crystal display is minimized and specifically, brightness in the oblique direction is enhanced and the viewing angle is enlarged.

One of the aspects of the present invention to achieve the above object is a liquid crystal display comprising: a brightness enhancing film, polarizing plate (A), a liquid crystal cell and polarizing plate (B) laminated in that order, Wherein (i) polarizing plate (A) has a polarizing plate protective film facing the brightness enhancing film; (ii) the polarizing plate protective film is a cellulose ester film; (iii) an in-plane retardation value Ro(550) of the cellulose ester film represented by Formula (I) is 0 to 5 nm; and (iv) a retardation value in a thickness direction Rt(550) of the cellulose ester film represented by Formula (II) is −15 to 15 nm, $$Ro(550)=(Nx-Ny) \times d \quad \text{Formula (I)}$$

$$Rt(550)=\{(Nx+Ny)/2-Nz\} \times d \quad \text{Formula (II)}$$

wherein Nx represent a maximum in-plane refractive index; Ny represents a minimum in-plane refractive index; Nz represents a refractive index in the thickness direction; d represents a thickness of the polarizing plate protective film (nm); and Ro(550) and Rt(550) each represent a retardation value measured at a wavelength of 550 nm.

DESCRIPTION OF THE PREFERRED EMBODIMENTS

Figure 1:
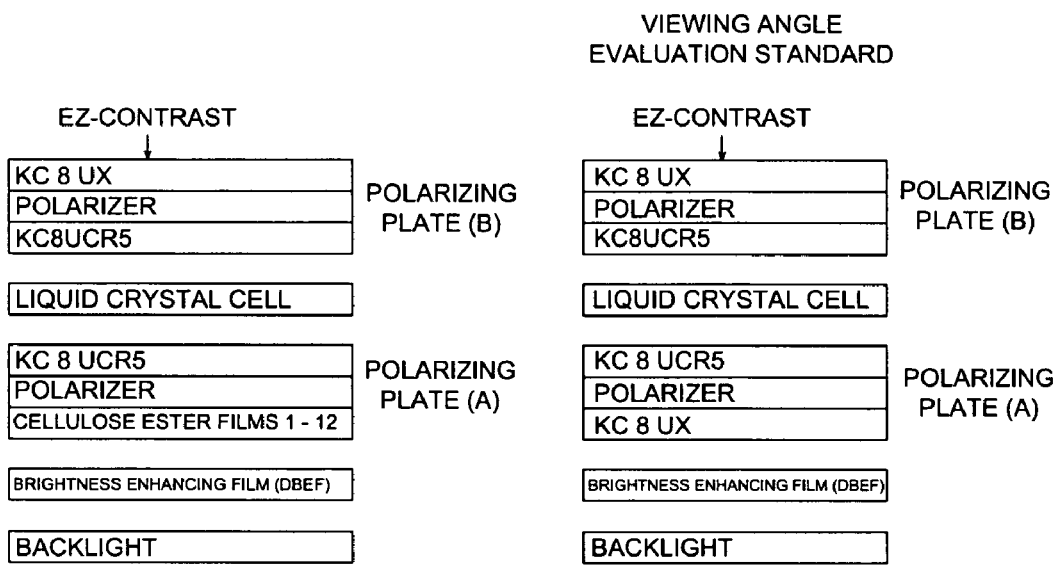
FIG. 1 shows the constitutions of a liquid crystal display of the present invention used in the examples and a standard liquid crystal display employed.

The above object of the present invention is achieved by the following structures.

(1) A liquid crystal display comprising: a brightness enhancing film, polarizing plate (A), a liquid crystal cell and polarizing plate (B) laminated in that order, wherein
  (i) polarizing plate (A) has a polarizing plate protective film facing the brightness enhancing film;
  (ii) the polarizing plate protective film is a cellulose ester film;
  (iii) an in-plane retardation value Ro(550) of the of the cellulose ester film represented by Formula (I) is 0 to 5 nm; and
  (iv) a retardation value in a thickness direction Rt(550) of the of the cellulose ester film represented by Formula (II) is −15 to 15 nm, $$Ro(550)=(Nx-Ny) \times d \quad \text{Formula (I)}$$

$$Rt(550)=\{(Nx+Ny)/2-Nz\} \times d \quad \text{Formula (II)}$$

wherein Nx represent a maximum in-plane refractive index; Ny represents a minimum in-plane refractive index; Nz represents a refractive index in the thickness direction; d represents a thickness of the polarizing plate protective film (nm); and Ro(550) and Rt(550) each represent a retardation value measured at a wavelength of 550 nm.

(2) The liquid crystal display of Item (1), wherein the cellulose ester film exhibits the following retardation values:

Ro(400) and Ro(700) each are in the range of 0 to 5 nm; and

Rt(400) and Rt(700) each are in the range of −15 to 15 nm, provided that

Ro(400) represent an in-plane retardation value measured at a wavelength of 400 nm;

Ro(700) represent an in-plane retardation value measured at a wavelength of 700 nm;

Rt(400) represent a retardation value in the thickness direction measured at a wavelength of 400 nm; and Rt(700) represent a retardation value in the thickness direction measured at a wavelength of 700 nm.

(3) The liquid crystal display of Item (1) or (2), wherein the cellulose ester film comprises:

(v) a cellulose ester;

(vi) polymer X being a polymer having a molecular weight of 2000 or more but 30000 or less, prepared by copolymerizing:

Xa which is an ethylenically unsaturated monomer having neither an aromatic ring nor a hydrophilic group in a molecule, and Xb which is an ethylenically unsaturated monomer having no aromatic ring but having a hydrophilic group in a molecule; and (vii) polymer Y being a polymer having a molecular weight of 500 or more but 3000 or less, prepared by polymerizing an ethylenically unsaturated monomer comprising no aromatic ring, wherein a weight average molecular weight of polymer X is larger than a weight average molecular weight of polymer Y.

(4) The liquid crystal display of Item (3), wherein polymer X is represented by Formula (1-1), and polymer Y is represented by Formula (2-1):

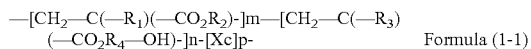

—[CH$_2$—C(—R$_1$)(—CO$_2$R$_2$)-]m—[CH$_2$—C(—R$_3$) (—CO$_2$R$_4$—OH)-]n-[Xc]p-  Formula (1-1)

wherein R$_1$ and R$_3$ each represent H or CH$_3$; R$_2$ represents an alkyl group or a cycloalkyl each having 1-12 carbon atoms; R$_4$ represents —CH$_2$—, —C$_2$H$_4$— or —C$_3$H$_6$—; Xc represents a monomer unit polymerizable with —[CH$_2$—C(—R$_1$) (—CO$_2$R$_2$)—]— and —[CH$_2$—C(—R$_3$)(—CO$_2$R$_4$—OH)—]—; and m, n and p each indicate a molar ratio, wherein m≠0, n≠0, and m+n+p=100,

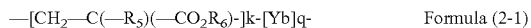

—[CH$_2$—C(—R$_5$)(—CO$_2$R$_6$)-]k-[Yb]q-  Formula (2-1)

wherein R$_5$ represents H or CH$_3$; R$_6$ represents an alkyl group or a cycloalkyl group each having 1-12 carbon atoms; Yb represents a monomer unit polymerizable with —[CH$_2$—C (—R$_5$)(—CO$_2$R$_6$)—]—; and k and q each indicate a molar ratio, wherein k≠0, and k+q=100.

(5) The liquid crystal display of any one of Items (1) to (4), wherein the cellulose ester film has a hard coat film having a thickness of 1-20 μm on a surface facing the brightness enhancing film of the cellulose ester film.

(6) The liquid crystal display of any one of Items (1) to (5), wherein a thickness of the cellulose ester film is 20-60 μm.

Based on the present invention, it is possible to provide a liquid crystal display which minimizes decrease in light utilization efficiency in the oblique direction in the liquid crystal display and, which specifically enhances brightness in the oblique direction, whereby a wider viewing angle is obtained.

Namely, in the present invention, by markedly decreasing the retardation of the cellulose ester film used as a polarizing plate protective film of polarizing plate (A) facing the brightness enhancing film (namely, the cellulose ester film is provided between the brightness enhancing film and the polarizer film of polarizing plate (A)), the loss of light due to absorption of light by the polarizing plate was decreased, whereby it became possible to achieve enhancement of brightness, even in oblique directions. Further, in the present invention, a hard coat layer was applied onto the surface of the cellulose ester film facing the brightness enhancing film, whereby it was possible to secure the desired uniformity of brightness.

The most preferred embodiments to practice the present invention will now be described, however, the present invention is not limited thereto.

The liquid crystal display of the present invention is composed of a brightness enhancing film, polarizing plate (A), a liquid crystal cell, and polarizing plate (B), laminated in that order. Its features are that the protective film provided between the brightness enhancing film and polarizing plate (A) is a cellulose ester film, wherein in-plane retardation value Ro(550) of the cellulose ester film, represented by following Formula (I), is in the range of 0-5 nm, and retardation value Rt(550) in the thickness direction of the cellulose ester film, represented by following Formula (II), is in the range of −15 to 15 nm.

$$Ro(550)=(Nx-Ny)\times d \quad \text{Formula (I)}$$

$$Rt(550)=\{(Nx+Ny)/2-Nz\}\times d \quad \text{Formula (II)}$$

wherein Nx and Ny each represents the maximum and minimum value of the in-plane refractive index of the film; Nz represents the refractive index in the thickness direction; d represents the thickness (nm) of the film; Ro(550) and Rt(550) each represent the retardation value measured at a wavelength of 550 nm.

As noted above, when the brightness enhancing film is employed, linear polarized light in the oblique direction is converted to elliptically polarized light due to retardation in the thickness direction of the TAC (triacetyl cellulose) film. Accordingly, the brightness in the oblique direction is decreased due to light absorption by the polarizer. In the present invention, it was found that by drastically decreasing the retardation of the cellulose ester film facing the brightness enhancing film, only limited light absorption loss was observed even in the oblique direction, whereby it was possible to achieve the desired enhancement of brightness.

It is possible to prepare the above cellulose ester film by preferably incorporating: (a) cellulose ester; (b) Polymer X having a weight average molecular weight of 2,000-30,000, which is prepared by copolymerizing an ethylenically unsaturated monomer Xa having neither an aromatic ring nor a hydrophilic group in the molecule, and an ethylenically unsaturated monomer Xb having no aromatic ring but having a hydrophilic group in the molecule; and (c) polymer Y at a weight average molecular weight of 500-3,000, which is prepared by polymerizing ethylenically unsaturated monomer Ya having no aromatic ring, while the weight average molecular weight of polymer X is larger than that of polymer Y.

Further, the polarizing plate protective film of polarizing plate (A) facing the brightness enhancing film is exposed to a high temperature which tends to result in variation and non-uniformity of the retardation, whereby problems have occurred in which the uniformity of brightness tends to vary. In the present invention, it was found to be possible to overcome the above problems by providing a hard coat layer on the cellulose ester film on the backlight side, as described in above Item (5).

Next, the present invention will be described in detail.

<Polymer X and Polymer Y>

Polymer X and polymer Y will now be explained, which are used in the cellulose ester film provided between the polarizing Plate A and the brightness enhancing film It is generally known that a material containing an aromatic ring in a monomer, specifically in a main chain, exhibits birefringence of cellulose ester, as well as positive birefringence. In order to maintain retardation value Rt of a cellulose ester film, a material exhibiting negative birefringence is preferably added into the film.

Polymer X of the present invention has a weight average molecular weight of 2000-30000 prepared by copolymerizing ethylenically unsaturated monomer Xa containing no aromatic ring and hydrophilic group within a molecule and ethylenically unsaturated monomer Xb containing no aromatic ring but a hydrophilic group within a molecule, and a polymer expressed by following Formula (1) is preferable.

-(Xa)m-(Xb)n-(Xc)p-  Formula (1)

More preferably, it is a polymer expressed by the following Formula (1-1):

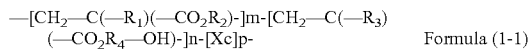

wherein $R_1$ and $R_3$ each represent H or $CH_3$; $R_2$ represents an alkyl group or a cycloalkyl each having 1-12 carbon atoms; $R_4$ represents $-CH_2-$, $-C_2H_4-$ or $-C_3H_6-$; Xc represents a monomer unit polymerizable with Xa and Xb; and m, n and p each indicate a molar ratio, wherein $m\neq 0$, $n\neq 0$, and $m+n+p=100$.

Examples of a monomer constituting polymer X of the present invention as a monomer unit are provided below, but the present invention is not limited thereto.

Examples of ethylenically unsaturated monomer Xa having no aromatic ring and no hydrophilic group within a molecule include methyl acrylate, ethyl acrylate, propyl acrylate (i-, n-), butyl acrylate (n-, i-, s-, t-), pentyl acrylate (n-, i-, s-), hexyl acrylate (n-, i-), heptyl acrylate (n-, i-), octyl acrylate (n-, i-), nonyl acrylate (n-, i-), myristyl acrylate (n-, i-), 2-ethylhexyl acrylate, ε-caprolactone acrylate, and 2-ethoxyethyl acrylate, or compounds in which the above acrylate esters are changed to methacrylate esters. Of these, methyl acrylate, ethyl acrylate, methyl methacrylate, ethyl methacrylate, and methacrylic acid propyl (i-, n-) are preferable.

As an ethylenically unsaturated monomer Xb having no aromatic ring but having a hydrophilic group, preferable is an acrylate ester or a methacrylate ester, examples of which include: 2-hydroxyethyl acrylate, 2-hydroxypropyl acrylate, 3-hydroxypropyl acrylate, 4-hydroxybutyl acrylate and 2-hydroxybutyl acrylate, or compounds in which the above acrylate esters are changed to methacrylate esters. Of these, 2-hydroxyethyl acrylate, 2-hydroxyethyl methacrylate, 2-hydroxypropyl acrylate, and 3-hydroxypropyl acrylate are preferable.

In the present invention, polymer X is synthesized via copolymerization employing the foregoing hydrophobic monomer Xa and hydrophilic monomer Xb.

The use ratio of hydrophobic monomer Xa and hydrophilic monomer Xb during synthesis is 99:1-65:35, and preferably 95:5-75:25. In the case of a large use ratio of hydrophobic monomer Xa, retardation value Rt becomes large, though compatibility with cellulose ester is improved. In the case of a large use ratio of hydrophobic monomer Xa, retardation value lowers effectively, though the above compatibility is deteriorated. When the use ratio of hydrophilic monomer Xb is within the above-described range, haze of the cellulose ester film is preferably lowered. Xc is not specifically limited when Xc is a copolymerizable ethylenically unsatulated polymer, but different from Xa or from Xb. Xc preferably does not contain an aromatic ring. The molar ratio "p" of Xc is preferably 0 to 10. Xc may be a plurality of monomer units.

It is preferable that the hydroxyl value of polymer X is 30-150 mgKOH/g.
(Measuring Method of Hydroxyl Value)
This measurement is based on JIS K 0070 (1992).

When 1 g of a sample is acetylized, a hydroxyl value is defined to be mg of potassium hydrate required to neutralize acetic acid bonded with a hydroxyl group. Specifically, X g of a sample (approximately 1 g) in a flask is weighed, 20 mg of acetylized reagent (Pyridine is added into 20 mg of acetic acid anhydride to make 400 ml) is precisely added into this to be heated in glycerin to 95-100° C., after an air cooling pipe is equipped at an inlet of the flask. After 1.5 hours followed by a cooling process, the acetic acid anhydride is decomposed into acetic acid by adding 1 ml of purified water via air cooling pipe. Next, 0.5 mol/L of a potassium hydrate solution is titrated employing a potentiometric titrator, and an inflexion point of the resulting titration curve is set to a terminal point. Further, a blank test is conducted by titrating with no sample to determine the inflexion point of a titration curve. The hydroxyl value is calculated employing the following formula.

Hydroxyl value=$[(B-C)\times f\times 28.05/X]+D$ where B is the amount(ml) of a 0.5 mol/L potassium hydrate ethanol solution used for a blank test, C is the amount (ml) of a 0.5 mol/L potassium hydrate ethanol solution used for titration, f is a factor of a 0.5 mol/L potassium hydrate ethanol solution, D is an acid value, and 28.05 indicates one half of 56.11 which is 1 mol quantity of potassium hydrate. The molecular weight of polymer X has a weight average molecular weight of 2000-30000, and preferably 3000-25000.

It is preferable that the large molecular weight has advantages to the low dimensional change of a polarizing plate at high-temperature and humidity and reduced curl in a polarizing plate protective film. In the case of a weight average molecular weight of at most 30000, compatibility with cellulose ester is improved, breed-out at a high temperature-high humidity condition is reduced, and formation of a film exhibiting low haze becomes possible.

The weight average molecular weight of polymer X in the present invention can be controlled by a commonly known molecular weight controlling method. For controlling the molecular weight, for example, a method can be applied in which adding a chain transfer agent such as carbon terachloride, laurylmercptane and octyl thioglycolate is employed. The polymerization is usually performed at a temperature of from a room temperature to 130° C., and preferably 50-100° C., and can be accomplished by adjusting polymerization reaction time.

A measuring method of a weight average molecular weight is described below.
(Molecular Weight Measuring Method)

The weight average molecular weight is measured employing a gel-permeation chromatography.

Measuring conditions are indicated below.
Solvent: Methylene chloride
Column: Shodex K806, K805, K803G
  (produced by Showa Denko K.K.)
Column temperature: 25° C.
Sample concentration: 0.1% by weight
Detector: RI Model 504
  (produced by GL Sciences Inc.)

Pump: L6000 (produced by Hitachi, Ltd.)
Feed rate: 1.0 ml/min
Calibration: Standardized polystyrene STK
standard Polystyrene (produced by TOSOH CORP.). A calibration curve is drawn by using 13 samples in the range of Mw=1,000,000-500. The intervals in Mw values among the 13 samples are equal.

It is preferable that polymer Y of the present invention has a weight average molecular weight of 500-3000 prepared by polymerizing ethylenically unsaturated monomer Ya containing no aromatic ring, and is a polymer expressed by following Formula (2). It is difficult to produce a polymer having a weight average molecular weight of less than 500 since a large amount of polymer remains, but when a polymer having a weight average molecular weight in the range of 500-3000 is incorporated, it is preferable that retardation Rt easily becomes lower.

-(Ya)k-(Yb)q- 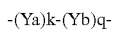 Formula (2)

More preferably, it is a polymer expressed by the following Formula (2-1):

—[CH$_2$—C(—R$_5$)(—CO$_2$R$_6$)-]k-[Yb]q- 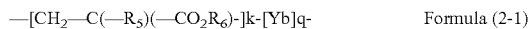 Formula (2-1)

wherein R$_5$ represents H or CH$_3$; R$_6$ represents an alkyl group or a cycloalkyl group each having 1-12 carbon atoms; Yb represents a monomer unit polymerizable with Ya; k and q each indicate a molar ratio, wherein k≠0, and k+q=100.

Yb is not specifically limited when Yb is an ethylenically unsatulated polymer copolymerizable with Ya. Xc may be a plurality of monomer units. The molar ratio "q" of Yb is preferably 0 to 30.

Examples of an ethylenically unsaturated monomer Ya constituting polymer Y prepared via polymerization of the ethylenically unsaturated monomer having no aromatic ring include: (i) methyl acrylate, ethyl acrylate, propyl acrylate (i-, n-), butyl acrylate (n-, i-, s-, t-), pentyl acrylate (n-, i-, s-), hexyl acrylate (n-, i-), heptyl acrylate (n-, i-), octyl acrylate (n-, i-), nonyl acrylate (n-, i-), myristyl acrylate (n-, i-), 2-ethylhexyl acrylate, ε-caprolactone acrylate, 2-hydroxyethyl acrylate, 2-methoxyethyl acrylate, and 2-ethoxyethyl acrylate, or compounds in which the above acrylate esters are changed to methacrylate esters; and (ii) unsaturated acids, for example, acrylic acid, methacrylic acid, maleic anhydride, crotonic acid and itaconic acid.

Yb is not specifically limited when it is an ethylenically unsaturated monomer copolymerizable with Ya, preferable examples of which include vinyl esters, for example, vinyl acetate, vinyl propionate, vinyl butyrate, vinyl valerate, vinyl pivalate, vinyl caproate, vinyl caprate, vinyl laurate, vinyl myristate, vinyl palmitate, vinyl stearate, vinyl cyclohexanecarboxylate, vinyl octylate, vinyl methacrylate, vinyl crotonate, vinyl sorbate, vinyl benzoate and vinyl cinnamate. Yb may contain plural monomers.

The acrylic monomer is a homopolymer or a copolymer of the above polymer, but the acrylic monomer has preferably an acrylic acid methylester monomer unit of not less than 30% by weight, preferably a methacrylic acid methylester monomer unit of not less than 40% by weight, and a homopolymer of acrylic acid methyl or of methacrylic acid methyl is particularly preferable.

For polymerizing polymer X and polymer Y, a method in which the molecular weight is not made excessively large and the molecular weight can be made as evenly as possible is preferably applied. Such the method includes: (i) a method using a peroxide polymerization initiator such as cumene peroxide and t-butyl hydroperoxide; (ii) a method using a larger amount of polymerization initiator than that in the usual polymerization method; (iii) a method using a chain-transfer agent such as a mercapto compound and carbon tetrachloride additionally to the polymerization initiator; (iv) a method using a polymerization terminator such as benzoquinone and dinitrobenzene in addition to the polymerization initiator; and (v) a method described in JP-A No. 2000-128911 or 2000-344823 in which bulk polymerization is carried out using a polymerization catalyst of (a) a compound having one thiol group and a secondary hydroxyl group, or (b) a combination of the compound described in above (a) and an organic metal compound. Any of the above methods can be preferably applied in the present invention, however, specifically preferable is a method disclosed in any of the above patent documents.

Any one of polymers such as a polymer prepared via polymerization of the above ethylenically unsaturated monomer exhibits excellent compatibility with a cellulose ester, excellent productibity with neither evaporation nor volatilization, excellent storage ability of a polarizing plate protective film, low moisture permeability, and excellent dimension stability.

It is preferred that the content of polymer X and polymer Y in a cellulose ester film is in the range satisfying following Formula (i) and Formula (ii). When the content of polymer X is Xg (% by weight), and the content of polymer Y is Yg (% by weight), $5 \leq Xg+Yg \leq 35$(% by weight)     Formula (i)

$0.05 \leq Yg/(Xg+Yg) \leq 0.4$     Formula (ii)

A preferable range of Formula (i) is 10-25% by weight.

When the total amount of polymer X and polymer Y is not at least 5% by weight, reduced retardation value Rt is insufficient. When the total amount of polymer X and polymer Y is not more than 35% by weight, adhesion to a polarizer PVA is easy.

When the content of polymer X is increased, degradation of the polarizer is largely reduced, however, retardation Rt tends to increase. Accordingly, the range satisfying the above Formula (ii) is preferable to obtain effects of the present invention.

Polymer X and polymer Y can be directly added and dissolved as a material constituting the dope which will be described later, or they are added into the dope after they are also dissolved in advance in an organic solvent used for dissolving cellulose ester.

(Cellulose Ester)

The cellulose ester used in the present invention is preferably a lower fatty acid ester of cellulose. The lower fatty acid represents one having 6 or fewer carbon atoms, including, for example: cellulose acetate, cellulose propionate, cellulose butyrate and mixed fatty acid esters disclosed in JP-A Nos. 10-45804, 8-231761, and U.S. Pat. No. 2,319,052, for example: cellulose acetate propionate and cellulose acetate butyrate. Among these, cellulose triacetate, and cellulose acetate propionate are specifically preferable. These cellulose esters can be used singly or by mixture.

An average acetylation degree (an amount of bonded acetic acid) preferably employed for cellulose triacetate is 54.0-62.5%, and more preferably 58.0-62.5%.

The preferable cellulose ester other than cellulose triacetate is a cellulose ester having an acyl groups having 2-4 carbon atoms as a substituent, which satisfies following Expressions (1) and (2) at the same time when a substitution degree of an acetyl group is designated as X, and a substitution degree of propionyl group is designated as Y.

$$2.8 \leq X+Y \leq 3.0 \quad (1)$$

$$1.0 \leq X \leq 2.95 \quad (2)$$

wherein X is a substitution degree of an acetyl group, and Y is a substitution degree of a propionyl group.

Of these, preferable is an cellulose acetate propionate of $1.0 \leq X \leq 2.95$, $0.1 \leq Y \leq 2.0$. The portion not replaced with an acyl group usually exist as a hydroxyl group. These materials can be synthesized using a method well known in the art.

Cellulose ester can be prepared using cotton linter, wood pulp or kenaf as starting materials which may be used alone or in combination. It is specifically preferable to use a cellulose ester prepared from cotton linter (hereafter merely referred to as linter) or from wood pulp singly or in combination.

In the case of a large molecular weight of cellulose ester, change in elastic modulus caused by heat is reduced, and in the case of excessively large molecular weight, productivity lowers since viscosity of a liquid used for dissolving cellulose ester becomes too high. The molecular weight of cellulose ester is preferably 60000-200000 in number average molecular weight (Mn), and more preferably 70000-170000.

The molecular weight distribution Mw/Mn is preferably 1.0-5.0 and more preferably 1.0-3.0.

(Plasticizers)

The dope to form a cellulose ester film of the present invention may contain a low molecular weight plasticizer, a low molecular weight UV absorbent or a low molecular weight anti-oxidizing agent. These compounds may be subsidiarily added to such an extent that a small amount of a low molecular weight plasticizer or a low molecular weight UV absorbent is not precipitated, if desired, and a material having no aromatic ring, which prevents increase of retardation Rt, is preferable.

The cellulose ester film of the present invention may utilize the following plasticizers.

Specific examples of the phosphoric acid ester based plasticizer include phosphoric acid alkyl esters such as triacetyl phosphate, tributyl phosphate and the like, phosphoric acid cycloalkyl esters such as tricyclopentyl phosphate, cyclohexyl phosphate and the like, phosphoric acid aryl esters such as triphenyl phosphate, tricresyl phosphate, cresylphenyl phosphate, octyldiphenyl phosphate, diphenylbiphenyl phosphate, trioctyl phosphate, tributyl phosphate, trinaphtyl phosphate, triglyceryl phosphate, tris ortho-biphenyl phosphate. The substituent groups for these maybe the same or different, and may be further substituted. The substituent groups may be a mix of alkyl groups, cycloalkyl groups and aryl groups, and the substituent groups may be bonded to each other by common bonds.

Examples of the phosphoric acid ester also include alkylene bis(dialkyl phosphates) such as ethylene bis (dimethyl phosphate), butylene bis(diethyl phosphate) and the like, alkylene bis(diaryl phosphates such as ethylene bis(diphenyl phosphate), propylene bis(dinaphtyl phosphate) and the like, arylene bis(dialkyl phosphates) such as phenylene bis(dibutyl phosphate), biphenylene bis(dioctyl phosphate) and the like, arylene bis(diaryl phosphates) such as phenylene bis(diphenyl phosphate), naphtylene bis (ditriyl phosphate) and the like. These substituent groups may the same or different, and may be further substituted. The substituent groups may be a mix of an alkyl group, cycloalkyl groups and aryl groups, and the substituent groups may be bonded to each other by common bonds.

Furthermore, a part of the structure of the phosphoric acid ester may be a part of the polymer or may be systematically included as a pendant. It may also be introduced into a part of the molecular structure of the additive such as the antioxidant, the acid scavenger, the ultraviolet light absorber and the like. Of the compounds listed above, aryl ester phosphates and arylene bis(diaryl phosphates) are preferable, and more specifically, triphenyl phosphate and phenylene bis(diphenyl phosphate) are preferable.

Specific examples of the ethylene glycol ester based plasticizers include ethylene glycol alkyl ester based plasticizers such as ethylene glycol diacetate, ethylene glycol dibutylate and the like, ethylene glycol cycloalkyl ester plasticizers such as ethylene glycol dicyclopropyl carboxylate and ethylene glycol dicyclohexyl carboxylate and the like, and ethylene glycol aryl ester based plasticizers such as ethylene glycol dibenzoate and ethylene glycol 4-methyl benzoate and the like. These alkylate groups, cycloalkylate groups and arylate groups may be same or different and may be further substituted. The substituent groups may be a mix of alkylate groups, cycloalkylate groups and aryl groups, and the substituent groups may be bonded to each other by common bonds. Furthermore, the ethylene glycol portion may be substituted and the ethylene glycol ester part of the structure may be a part of the polymer or may be systematically included as a pendant. It may also be introduced into a part of the molecular structure of the additive such as an antioxidant, an oxygen scavenger and a UV absorbent.

Specific examples of the glycerin ester based plasticizer include glycerin alkyl esters such as triacetin, tributyrin, glycerin diacetate caprylate, glycerin oleate propionate and the like, glycerin cycloalkyl esters such as, glycerin tricyclopropyl carboxylate, glycerin tricyclohexyl carboxylate and the like, glycerin aryl esters such as glycerin tribenzoate, glycerin 4-methyl benzoate and the like, diglycerin alkyl esters such as diglycerin tetraactylate, diglycerin tetrapropionate, diglycerin acetate tricaprylate, diglycerin tetralaurate and the like, diglycerin cycloalkyl esters such as diglycerin tetracyclobutyl carboxylate, diglycerin tetracyclopentyl carboxylate and the like, diglycerin aryl esters such as diglycerin tetrabenzoate, diglycerin 3-methylbenzoate and the like. These alkylate groups, cycloalkyl carboxylate groups and arylate groups may be same or different and may be further substituted. The substituent groups may be a mix of alkylate groups, cycloalky carboxylate groups and aryl groups, and the substituent groups may be bonded to each other by common bonds. Furthermore, the glycerin and diglycerin portions may be substituted and the glycerin ester or diglycerin ester part of the structure may be a part of the polymer or may be systematically included as a pendant. It may also be introduced into a part of the molecular structure of the additive such as the antioxidant, the oxygen scavenger, the UV absorbent and the like.

Specific examples of the polyhdric alcohol based plasticizer are given in JP-A No. 2003-12823 from paragraphs 30-33.

These alkylate groups, cycloalkyl carboxylate groups and arylate groups may be same or different and may be further substituted. The alkylate groups, cycloalky carboxylate groups and arylate groups may be mixed, and the substituent groups may be bonded to each other by common bonds. Furthermore, the polyhydric alcohol portion may be substituted and polyhydric alcohol part of the structure may be a part of the polymer or may be systematically included as a pendant. It may also be introduced into a part of the molecular structure of the additive such as the antioxidant, the oxygen scavenger, the UV absorbent and the like.

Examples of the carboxylic acid ester based plasticizer include alkyl dicarboxylic acid alkyl ester based plasticizers such as didodecyl moranate (C1), dioctyl adipate (C4), dibutyl cevacate (C8) and the like, alkyl dicarboxylic acid cycloalkyl ester based plasticizers such as dicyclopentyl succinate, dicyclohexyl adipate and the like, alkyl dicarboxylic acid aryl ester based plasticizers such as diphenyl succinate, di-4-methyl phenyl glutarate and the like, cycloalkyl dicarboxylic acid alkyl ester based plasticizers such as dihexyl 1-4-cyclohexane dicarboxylate, didecyl bicyclo [2.2.1]heptane-2,3-dicarboxylate and the like, cycloalkyl dicarboxylic acid dicycloalkyl ester based plasticizers such as dicyclohexyl-1,2-cyclobutane dicarboxylate, dicyclopropyl-1,2-cyclohexyl dicarboxylate and the like, cycloalkyl dicarboxylic acid aryl ester based plasticizers such as diphenyl 1,1-cyclopropyl dicarboxylate, di 2-naphtyl 1,4 cyclohexane dicarboxylate and the like, aryl dicarboxylic acid alkyl ester based plasticizers such as diethyl phthalate, dimethyl phthalate, dioctyl phthalate, dibutyl phthalate, di-2-ethyl hexyl phthalate and the like, aryl dicarboxylic acid cycloalkyl ester based plasticizers such as dicyclopropyl phthalate, dicyclohexyl phthalate and the like and aryl carboxylic acid aryl ester based plasticizers such as diphenyl phthalate, di-4-methyl phenyl phthalate. These alkoxy groups and cycloalkoxy groups may be the same or different, and may also be substituted and the substitution groups may be further substituted. The alkyl groups and the cycloalkyl groups may be mixed, and the substituent groups may be bonded to each other by common bonds. Furthermore, the aromatic ring of the phthalic acid may be substituted and may be polymer such as a dimer, trimer, tetramer and the like. The phthalic acid ester part of the structure may be a part of the polymer or may be systematically included as a pendant. It may also be introduced into a part of the molecular structure of the additive such as the antioxidant, the oxygen scavenger, the UV absorbent and the like.

Specific examples of the polyhydric carboxylic acid ester plasticizers include alkyl polyhydric carboxylic acid alkyl ester based plasticizers such as tridodecyl tricarbalate, tributyl-meso-butane 1,2,3,4-tetracarboxylate and the like, alkyl polyhydric carboxylic acid cycloalkyl ester based plasticizers such as tricyclohexyl tricarbalate, tricyclopopyl-2-hydroxy-1,2,3-propane tricarboxylate, alkyl polyhydric carboxylic acid aryl ester based plasticizers such as triphenyl 2-hydroxyl-1,2,3-propane tricarboxylate, tetra 3-methyl phenyl tetrahydrofuran-2,3,4,5-tetracarboxylate and the like, cycloalkyl polyhydric carboxylic acid alkyl ester based plasticizers such as tetrahexyl-1,2,3,4-cyclobutane tetracarboxylate, tetrabutyl-1,2,3,4-dicyclopentane tetracarboxylate and the like, cycloalkyl polyhydric carboxylic acid cycloalkyl ester based plasticizers such as tetracyclopropyl-1,2,3,4-cyclobutane tetracarboxylate, tricyclohexyl-1,3,5-cyclohexyl tricarboxylate and the like, cycloalkyl polyhydric carboxylic acid aryl ester based plasticizers such as triphenyl-1,3,5-cyclohexyl tricarboxylate, hexa 4-methyl phenyl-1,2,3,4,5,6-cyclohexyl hexacarboxylate and the like, aryl polyhdric carboxylic acid alkyl ester based plasticizers such as tridodecyl benzene-1,2,4-tricarboxylate, tetraoctyl benzene-1,2,4,5-tetracarboxylate and the like, aryl polyhdric carboxylic acid cycloalkyl ester based plasticizers such as tricyclopentyl benzene-1,3,5-tricarboxylate, tetracyclohexyl benzene-1,2,3,5-tetracarboxylate and the like, and aryl polyhdric carboxylic acid aryl ester based plasticizers such as triphenyl benzene-1,3,5-tetracarboxylate, hexa 4-methylphenyl benzene-1,2,3,4,5,6-hexacarboxylate and the like. These alkoxy groups and cycloalkoxy groups may be the same or different, and may also be substituted and the substitution groups may be further substituted. The alkyl groups and the cycloalkyl groups may be mixed, and the substituent groups may be bonded to each other by common bonds. Furthermore, the aromatic ring of the phthalic acid may be substituted and may be polymer such as a dimer, trimer, tetramer and the like. The phthalic acid ester part of the structure may be a part of the polymer or may be systematically included as a pendant. It may also be introduced into a part of the molecular structure of the additive such as the antioxidant, the oxygen scavenger, the UV absorbent and the like.

(UV Absorbent)

The polarizing plate protective film and other films used in the liquid crystal image display device include a UV absorbent, and the UV absorbent has the role of preventing deterioration of the liquid crystals or the polarizing film when the device is used outdoors. The UV absorbent is preferably used in this invention also. The UV absorbents exhibit excellent absorption for ultraviolet radiation having a wavelength of no longer than 370 nm and exhibit minimal absorption for visible light having a wavelength of no shorter than 400 nm. The transmittance at 370 nm in particular is preferably no greater than 10%, and more preferably no greater than 5% and still more preferably, no greater than 2%. Examples of the UV absorbent used in this invention include oxybenzophenone based compounds, benzotriazole based compounds, salicylic acid ester based compounds, benzophenone based compounds, cyano acrylate based compounds, nickel complex based compounds, and the like. Of these, benzotriazole compounds which result in less coloration are preferred. The benzotriazole based UV absorbents and the benzophenone based UV absorbents which exhibit stability in light are preferable, and benzotriazole based UV absorbents which result in little coloration which is not required is particularly preferred. Examples include TINUVIN 109 (called UV-1), TINUVIN 171, TINUVIN 326, TINUVIN 327, and TINUVIN 328 which are manufactured by Chiba Specialty Chemical Co., Ltd. The amount of UV absorbents which have low molecular weight that is used is between 1 and 10% by weight because there is the possibility that there will be web deposition or volatilizing during formation of the film due to the amount of the UV absorbent, as is the case with the plasticizer.

In this invention, the high molecular weight UV absorbent in which deposition and the like due to the above-described low molecular weight UV absorbent is unlikely to occur, is preferably included in the polymer as well as the cellulose ester film of this invention. As a result, the ultraviolet light can cut adequately in a stable state without losing dimensional stability, storage stability, water vapor permeability and the like, and without phase separation in the film. Those high molecular weight polymers described in Japanese Patent O.P.I. publication No. 6-148430 and the polymers including UV absorbing monomers may be used without limit as the high molecular weight UV absorbent polymer used in this invention.

In this invention, it is particularly preferable that the UV absorbing copolymer (high molecular weight UV absorbent) synthesized from the UV absorbing monomer shown in Formula (3) is included.

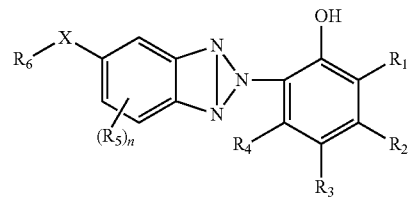

Formula (3)

where n is an integer of 0-3, each of $R_1$-$R_5$ is a hydrogen atom, a halogen atom or a substitution group, X represents —COO—, —CONR$_7$, —OCO—, or NR$_7$CO—, and each of $R_6$ and $R_7$ is a hydrogen atom, an alkyl group or an aryl group, but a group represented by $R_6$ includes a polymerizable group as a structural part.

In Formula (3), n represents an integer of 0-3, and when n is 2 or more, the plurality of $R_5$ may be the same or different, and may be linked to each other to form a chain with 5-7 members.

$R_1$ to $R_5$ each represents a hydrogen atom, a halogen atom or a substituent group. Examples of the halogen atom include a fluorine atom, a chlorine atom, a bromine atom, and an iodine atom, and the fluorine atom and the chlorine atom are preferable. In addition, examples of the substituent group includes an alkyl group (such as a methyl group, an ethyl group, an isopropyl group, a hydroxyethyl group, a methoxymethyl group, a trifluoromethyl group, a t-butyl group and the like), an alkenyl group (such as a vinyl group, an aryl group, a 3-butene-1-yl group and the like), an aryl group (such as a phenyl group, a naphtyl group, a p-triyl group, a p-chlorophenyl group and the like), a hetero-cyclic group (such as a pyridyl group, a benzimidazole group, a benzthiazole group, a benzoxazolyl group and the like), an alkoxy group (such as a methoxy group, an isopropoxy group, an n-butoxy group and the like), aryloxy group (such as a phenoxy group and the like), a hetero-cyclic oxy group (such as 1-phenyltetrazole-5-oxy group, 2-tetrahydropyranyloxy group and the like), an acyloxy group (such as an acetoxy group, pivaroyloxy group, a benzoyloxy group and the like), an acyl group (such as an acetyl group, a propanoyl group, a butyroyl group), an alkoxycarbonyl group (such as a methoxycarbonyl group, an ethoxycarbonyl group and the like), an aryloxy carbonyl group (such as a phenoxy carbonyl group and the like), a carbamoyl group (such as a methyl carbamoyl group, an ethyl carbamoyl, a dimethyl carbamoyl group), an amino group, an alkyl amino group (such as a methyl amino group, an ethyl amino group, a diethyl amino group and the like), anilino group (such as N-methyl anilino and the like), an acyl amino group (such as an acetyl amino group, a propionyl amino group, and the like) a hydroxyl group, a cyano group, a nitro group, a sulfonamide group (such a methane sulfonamide group, a benzene sulfonamide group and the like), a sulfamoyl amino group (such as a dimethyl sulfamoyl amino group and the like), a sulfonyl group (such as a methane sulfonyl group, a butane sulfonyl group, a phenyl sulfonyl group and the like), a sulfamoyl group (such as ethyl sulfamoyl group, dimethyl sulfamoyl group and the like), a sulfonyl amino group (such as a methane sulfonyl amino group, a benzene sulfonyl amino group and the like), a ureido group (such as a 3-methyl ureido group, a 3,3-dimethyl ureido group, a 1,3 dimethyl ureido group and the like), an imide group (such as a phthalimide group and the like), a silyl group (such as trimethyl silyl, triethyl silyl, t-butyldimethyl silyl group and the like), an alkylthio group (such as a methyl thio group, an ethyl thio group, an n-butyl thio group and the like), an arylthio group (such as phenylthio group and the like), and of these the alkyl group and aryl group are preferable.

In Formula (3), in the case where the groups represented by $R_1$ to $R_5$ may be further substituted, they may have additional substituent groups, and adjacent $R_1$ to $R_4$ may link with each other to form rings having 5-7 members.

$R_6$ represents a hydrogen atom, an alkyl group, a cycloalkyl group, an alkenyl group, an alkinyl group, an aryl group, or a heterocyclic group, and examples of the alkyl group include a methyl group, an ethyl group, a propyl group, an isopropyl group, a n-butyl group, an isobutyl group, a t-butyl group, an amyl group, an isoamyl group, a hexyl group and the like. In addition, the foregoing alkyl groups may further have a halogen atom or a substituent group. Examples of the halogen atom include fluorine atom, a chlorine atom, a bromine atom, an iodine atom and the like. Examples of the substituent group include an aryl group (such as a phenyl group, a napthyl group, a p-tolyl group, a p-chlorophenyl group and the like, an acyl group (such as an acetyl group, a propanoyl group, a butyroyl group and the like), an alkoxy group (such as a methoxy group, an ethoxy group, an isopropoxy group, an n-butoxy group and the like), and aryloxy group (such as a phenoxy group and the like), an amino group, an alkyl amino group (such as a methyl amino group, an ethyl amino group, a diethyl amino group), an anilino group (such N-methyl anilino and the like), an acyl amino group (such as an acetyl amino group, a propionyl amino group and the like), a hydroxyl group, a cyano group, a carbamoyl group (such as a methyl carbamoyl group, an ethyl carbamoyl, a dimethyl carbamoyl group and the like), an acyloxy group (such as an acetoxy group, pivaroyloxy group, a benzoyloxy group and the like), alkoxycarbonyl group (such as a metoxycarbonyl group, an etoxycarbonyl group and the like), and an aryloxy carbonyl group (such as a phenoxy carbonyl group and the like).

Examples of the cycloalkyl group include saturated ring hydrocarbons such as a cyclopentyl group, a cyclohexyl group, a norbonyl group, an adamantyl group and the like and these may be substituted or unsubstituted.

Examples of the alkenyl group include a vinyl group, an aryl group, a 1-methyl-2-propenyl group, a 3-butenyl group, a 2-butenyl group, a 3-methyl-2-butenyl group, an oleyl group and the like. Of these the vinyl group and the 1-methyl-2-propenyl group are preferable.

Examples of the alkinyl group include an ethynyl group, a butadyl group, a phenyl ethynyl group, a propalgyl group, a 1-methyl-2-propinyl group, a 2-butinyl group, a 1,1-dimethyl-2-propinyl group and the like, and of these the ethynyl group and the propalgyl group are preferable.

In Formula (3), X represents —COO—, —CONR$_7$, —OCO—, or NR$_7$CO—.

$R_7$ represents a hydrogen atom, an alkyl group, a cycloalkyl group, an aryl group, or a heterocyclic group, and examples of the alkyl group include a methyl group, an ethyl group, a propyl group, an isopropyl group, an n-butyl group, an isobutyl group, a t-butyl group, an amyl group, an isoamyl group, a hexyl group and the like. The alkyl group may have a halogen atom or a substituent group. Examples of the halogen atom include a fluorine atom, a chlorine atom, a bromine atom, and an iodine atom and the like. Examples of the substituent group include an aryl group (such as a phenyl group a napthyl group, a p-tolyl group, a p-chlorophenyl group, and the like), an acyl group (such as an acetyl group, a propanoyl group, a butyroyl group and the like), an alkoxy group (such as a methoxy group, an ethoxy group, an isopropoxy group, an n-butoxy group and the like), and aryloxy group (such as a phenoxy group and the like), an amino group, an alkyl amino group (such as a methyl amino group, an ethyl amino group, a diethyl amino group and the like), an anilino group (such as N-methyl aniline and the like), an acyl amino group (such as an acetyl amino group, a propionyl amino group), a hydroxyl group, a cyano group, a carbamoyl group (such as a methyl carbamoyl group, an ethyl carbamoyl group, a dimethyl carbamoyl group and the like), an acyloxy group (such as an acetoxy group, pivaroyloxy group, a benzoyloxy group and the like), and an alkoxy carbonyl group (such as a methoxy carbonyl group, an ethoxy carbonyl group and the like).

Examples of the cycloalkyl group include saturated ring hydrocarbons such as a cyclopentyl group, a cyclohexyl group, a norbonyl group, an adamantyl group and the like and these may be substituted or unsubstituted.

The polymerizable group of this invention refers to an unsaturated ethylene based polymerizable group or a polycondensation group with two functional groups, but is preferably an unsaturated ethylene based polymerizable group. Specific examples of the unsaturated ethylene based polymerizable group include a vinyl group, an aryl group, an acryloyl group, a methacryloyl group, a styryl group, an acrylamide group, a methacryalmide group, a vinyl cyanide group, a 2-cyanoacryl oxy group, 1,2-epoxy group, a vinyl benzyl group, a vinyl ether group, and the like. Of these, the vinyl group, the acryloyl group, the methacryloyl group, the acrylamide group, and the methacrylamide group are preferable. Furthermore including a polymerizable group as a structural part refers to the polymerizable group being linked directly or by a bonding group with a valency of 2 or higher. Examples of the bonding group with a valency of 2 or higher include an alkylene group (such as methylene, 1,2-ethylene, 1,3-propylene, 1-4 butylene, cyclohexane-1,4-diyl and the like), an alkenylene group (such as ethylene-1,2-diyl, butadiene-1,4-diyl and the like), an alkinylene group (such as ethene 1,2-diyl, butadiene-1,3-diyl-1,4-diyl and the like) and a bonding group derived from a compound including at least one aromatic group (such as substituted or unsubstituted benzene, condensed polycyclic carbon, an aromatic heterocyclic ring, an aromatic hydrocarbon ring aggregate, an aromatic heterocyclic aggregate and the like), a hetero atom bonding group (such as an oxygen, sulfur, nitrogen, silicon, or phosphorous atom and the like), and of these a preferable example is a group in which the alkylene group and the heteroatom are bonded. The bonding groups may be further combined to form a heterocyclic group. The weight average molecular weight of the polymer derived from the ultraviolet light absorbing monomer is preferably in the range between 2,000 and 30,000 and more preferably in the range between 5,000 and 20,000.

The weight average molecular weight of the ultraviolet light absorbing polymer can be prepared by a known molecular weight preparation method. Examples of the preparation method include a method using a chain transfer agent such as carbon tetrachloride, lauryl methacarptan, octyl thioglycolate and the like. The polymerization temperature may be between room temperature and 130° C., and more preferably between 50° C. and 100° C.

The ultraviolet light absorbing polymer used in this invention may be a homopolymer of a monomer, or a copolymer with another polymerizable monomer. Examples of the other polymerizable monomer which can form a copolymer include unsaturated compounds such as a styrene derivative (such as styrene, α-methyl styrene, o-methyl styrene, m-methyl styrene, p-methyl styrene, vinyl naphthalene and the like), ester acrylic derivatives (such as methyl acrylate, ethyl acrylate, propyl acrylate, butyl acrylate, i-butyl acrylate, t-butyl acrylate, octyl acrylate, cyclohexyl acrylate, benzyl acrylate and the like), methacrylic acid ester derivatives (such as methyl methacrylate, ethyl methacrylate, propyl methacrylate, butyl methacrylate, i-butyl methacrylate, t-butyl methacrylate, octyl methacrylate, cyclohexyl methacrylate, benzyl methacrylate and the like), alkyl vinyl ethers (such as methyl vinyl ether, ethyl vinyl ether, butyl vinyl ether, and the like), alkyl vinyl esters (such as vinyl formate, vinyl acetate, vinyl butylate, vinyl caproate, vinyl stearinate and the like), crotonic acid, maleinic acid, fumaric acid, itaconic acid, acrylonitrile, methacrylonitrile, vinyl chloride, vinyledene chloride, acryl amide, methacryl amide. Of these, methyl acrylate, methyl methacrylate, and vinyl acetate are preferable.

The copolymer component other than the ultraviolet light absorbing monomer in the polymer derived from the ultraviolet light absorbing monomer preferably includes at least one hydrophilic ethylene-based unsaturated monomer.

The hydrophilic ethylenically unsaturated monomer is not particularly limited provided that it is hydrophilic and that there is a polymerizable unsaturated double bond in the molecule such as the unsaturated carboxylic acids of acrylic acid or methacrylic acid, or acrylic or methacrylic esters which have a hydroxyl group or an ether bond (such as 2-hydroxyethyl methacrylate, 2-hydroxypropyl methacrylate, tetrahydrofurfuryl methacrylate, 2-hydroxyethyl acrylate, 2-hydroxypropyl acrylate, 2,3-dihydroxy-2-methyl propyl methacrylate, tetrahydrofurfuryl acrylate, 2-etoxyethyl acrylate, diethylene glycol etoxylate acrylate, 3-methoxybutyl acrylate and the like), acryl amides (N-substituent) (meth) acrylamides such as N,N-dimethyl(meth) acrylamide, N,N dimethyl(meth)acrylamide and the lke, N-vinyl pyrrolidone, N-vinyloxazolidone and the like.

The hydrophilic ethylenically unsaturated monomer is preferably a meth(acrylate) including a hydrocarbon group or a carboxyl in the molecule and 2-hydroxyethyl methacrylate, 2-hydroxypropyl methacrylate, 2-hydroxyethyl acrylate and 2-hydroxypropyl acrylate are particularly preferable.

One type of these polymerizable monomers maybe used, or alternatively two or more types of these polymerizable monomers maybe used together to form copolymers with the ultraviolet light absorbing monomers.

Polymerization methods for obtaining the ultraviolet absorbing copolymer in the invention are not specifically limited, but methods known heretofore can be widely used. These include a radical polymerization, an anion polymerization, and a cation polymerization and the like. Initiators of the radical polymerization include azo compounds, peroxide compound and the like, azobisisobutyronitrile (AIBN), azobisisobutyric acid diester derivatives, benzoyl peroxide, hydrogen peroxide and the like. Solvents used in the polymerization are not specifically limited, but include an aromatic hydrocarbon solvent such as toluene or chlorobenzene, a halogenated hydrocarbon solvent such as dichloroethane or chloroform, an ether solvent such as tetrahydrofuran or dioxane, an amide solvent such as dimethylformamide, an alcohol solvent such as methanol, an ester solvent such as methyl acetate or ethyl acetate, a ketone solvent such as acetone, cyclohexanone, methyl ethyl ketone and the like. Solution polymerization in a homogenous system, precipitation polymerization in which polymerization products precipitate, and emulsion polymerization in a micelle can be carried out by selecting solvents for polymerization. However, the ultraviolet light absorbing latex obtained by emulsion polymerization is not suitable for use as an optical film.

The ratio in which the ultraviolet light absorbing monomer, the polymerizable monomer that can form a copolymer therewith and the hydrophilic ethylenically unsaturated polymer is suitably selected while giving consideration to the effect on compatibility of the obtained ultraviolet light absorbing copolymer and the other transparent polymer, as well as the transparency and mechanical strength of optical film.

The amount of the ultraviolet light absorbing monomer included in the polymer derived from the ultraviolet light absorbing monomer is preferably 1-70% by weight, and more preferably 5-60% by weight. If the amount of the ultraviolet light absorbing monomer in the ultraviolet light absorbing polymer is less than 1% by weight, in the case where the desired ultraviolet light absorbing properties seem to be insufficient, a large volume of ultraviolet light absorbing polymer must be used and transparency is reduced due to increased haze or sedimentation and the like, and this becomes a factor in the reduction of film strength. Meanwhile, if the amount of the ultraviolet light absorbing monomer in the ultraviolet light absorbing polymer is less than 70% by weight, the compatibility with cellulose ester is favorable and a transparent film becomes easy to obtain. Also the solubility of the polymer in the solvent becomes high, which is favorable in view of easiness in film forming operation and productivity of the film.

The amount of the hydrophilic ethylenically unsaturated monomer included in ultraviolet light absorbing copolymer is preferably 0.1-50% by weight. If it is less than 0.1% by weight, the effect of improved compatibility due to hydrophilic ethylenically unsaturated monomer is not seen, while if the amount is more than 50% by weight, purification of the copolymer by isolation becomes difficult. It is more preferable that the amount of the hydrophilic ethylenically unsaturated monomer included is in the range of 0.5-20% by weight. In the case where the ultraviolet light absorbing monomer itself is substituted with a hydrophilic group, it is preferable that the total amount of the hydrophilic ultraviolet light absorbing monomer and the hydrophilic ethylenically unsaturated hydrophilic ethylenically unsaturated monomer is within the foregoing range.

In order for the ultraviolet light absorbing monomer and the hydrophilic monomer to be within the foregoing range, it is preferable that in addition to including both these substances, an ethylenically unsaturated monomer which does not have a hydrophilic group in the molecule is included the polymer.

Two types each of the ultraviolet light absorbing monomer and the (non hydrophilic or) hydrophilic and ethylenically unsaturated monomer may be mixed and polymerized.

The following is a detailed description of typical examples of the ultraviolet light absorbing monomer used in the present invention, but the invention is not to be limited by these examples.

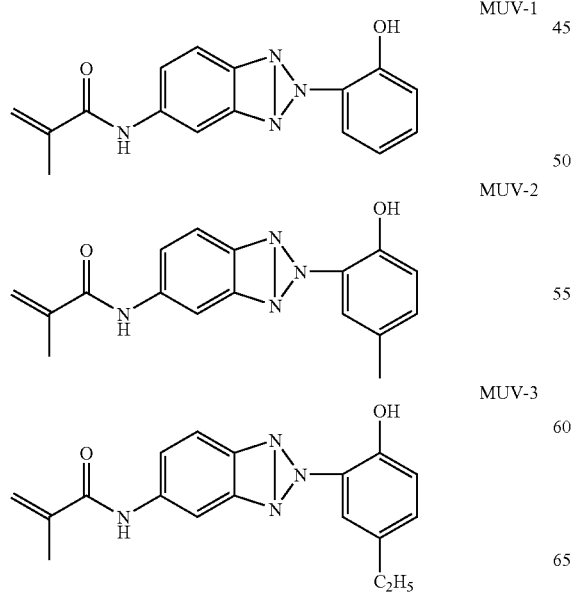

-continued

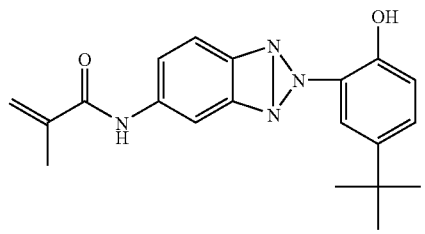

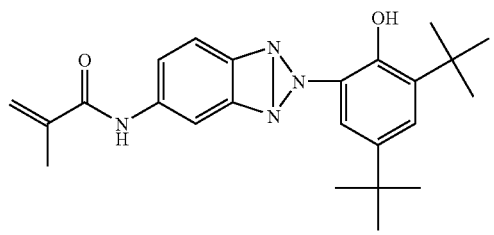

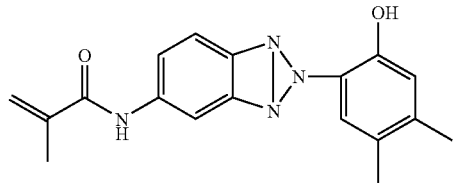

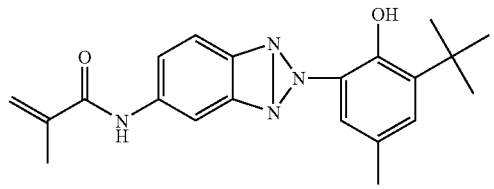

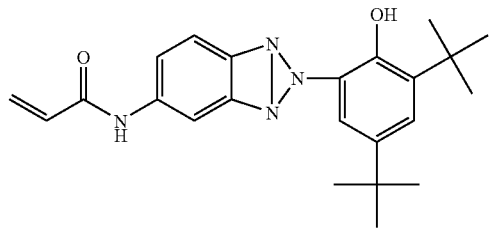

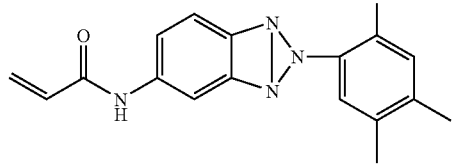

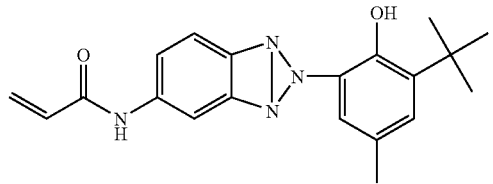

MUV-11
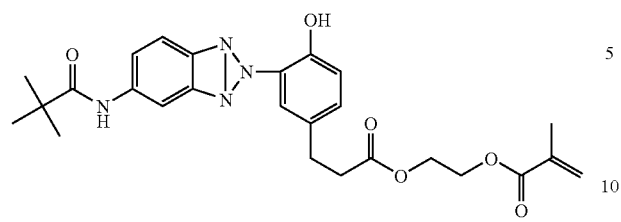
MUV-12
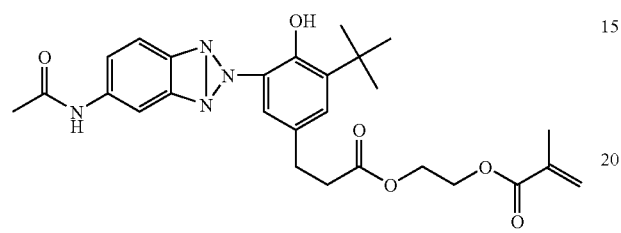
MUV-13
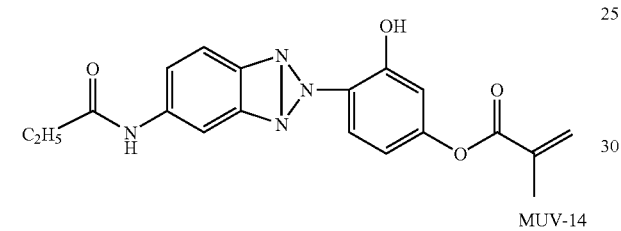
MUV-14
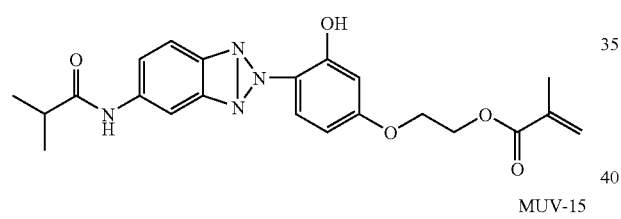
MUV-15
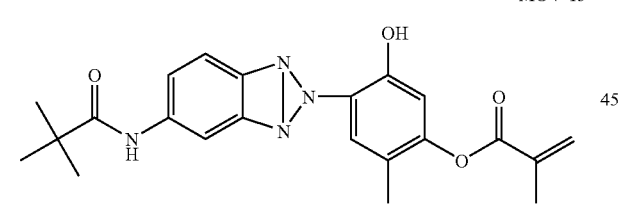
MUV-16
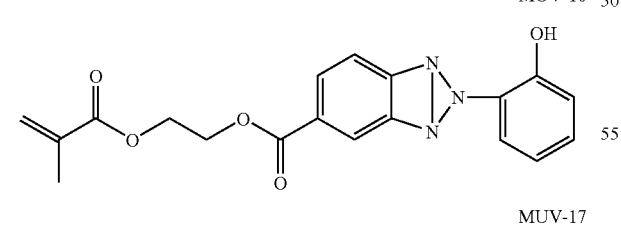
MUV-17
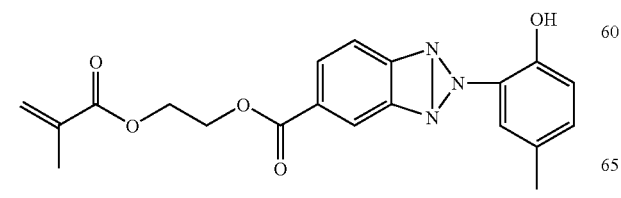
MUV-18
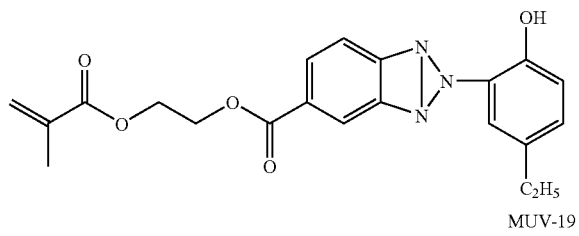
MUV-19
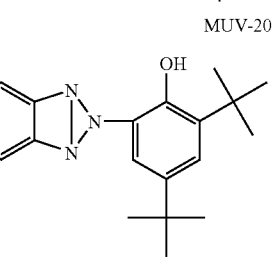
MUV-20
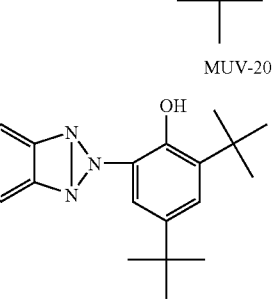
MUV-21
MUV-22
MUV-23
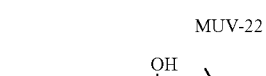
MUV-24
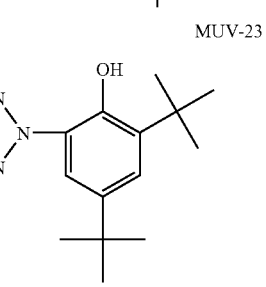

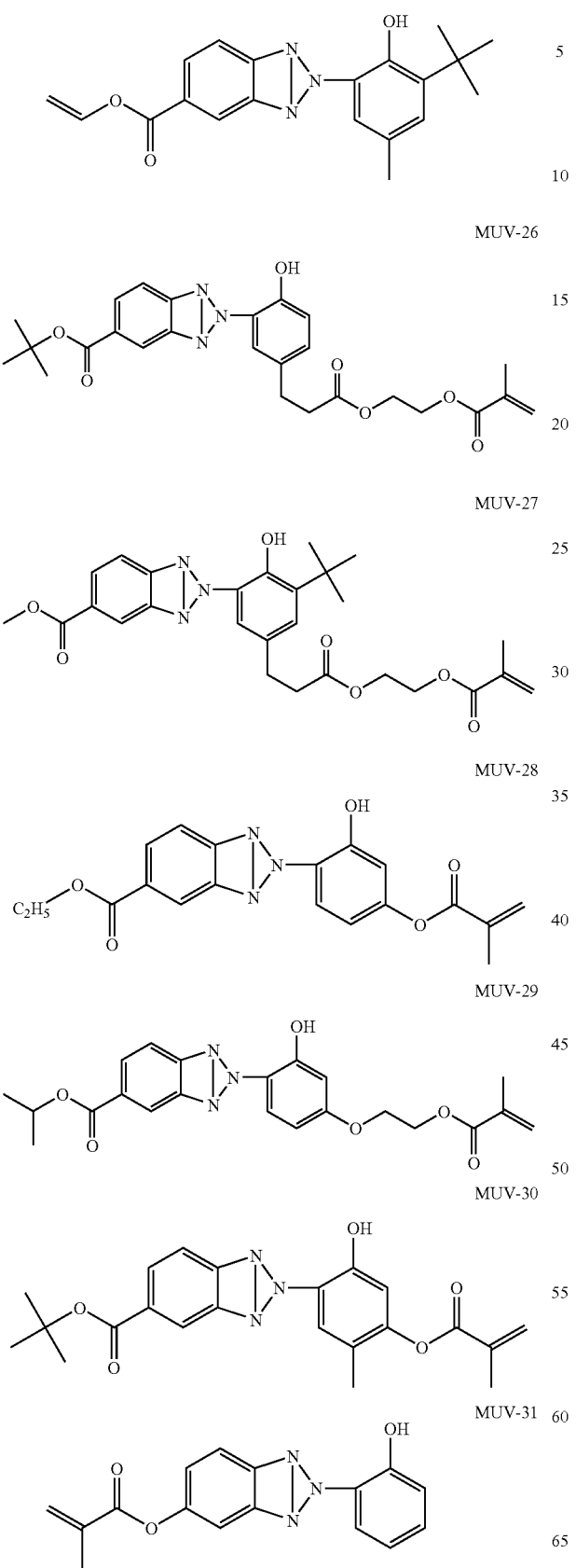
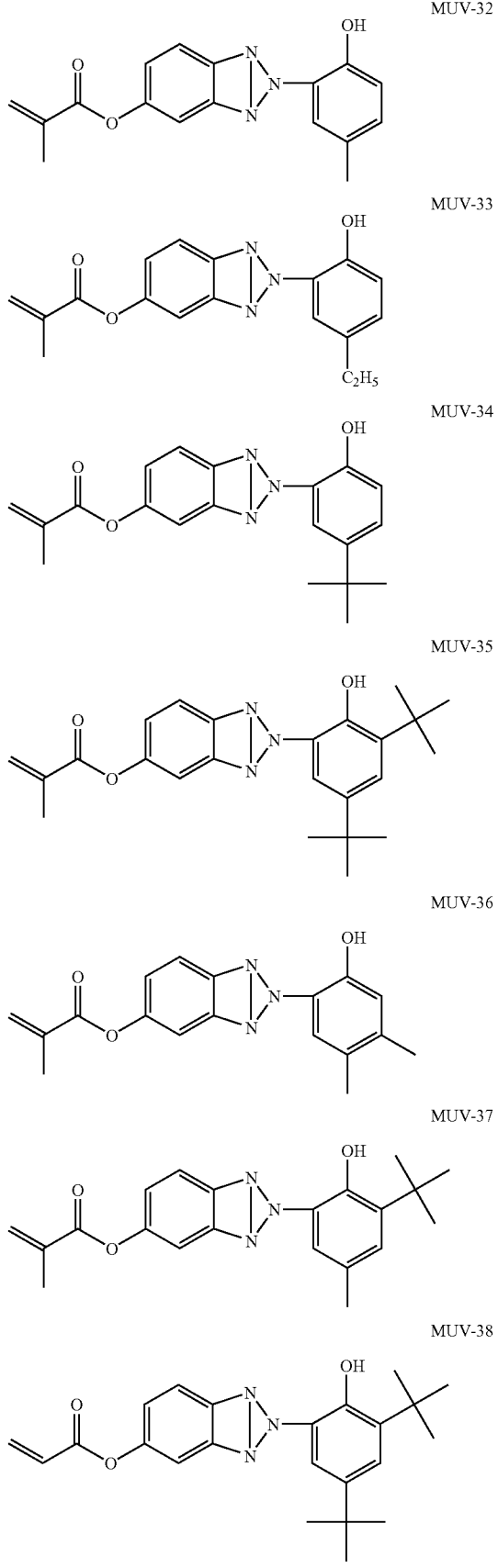

MUV-39
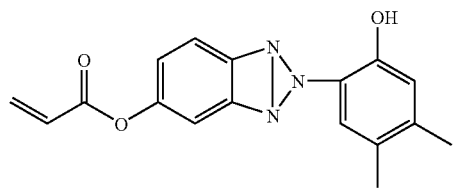
MUV-40
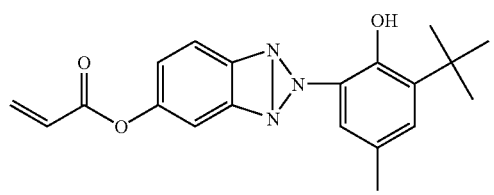
MUV-41
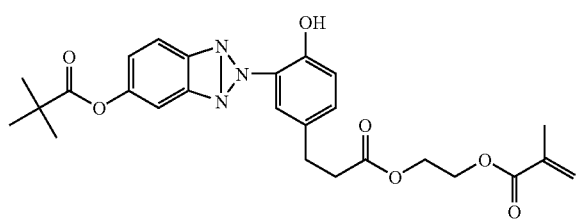
MUV-42
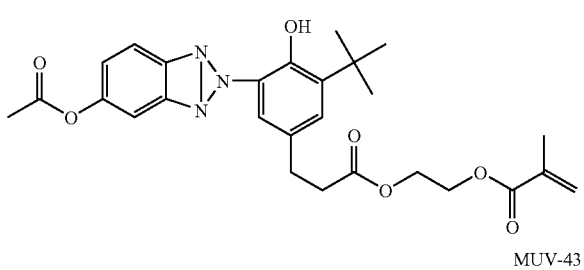
MUV-43
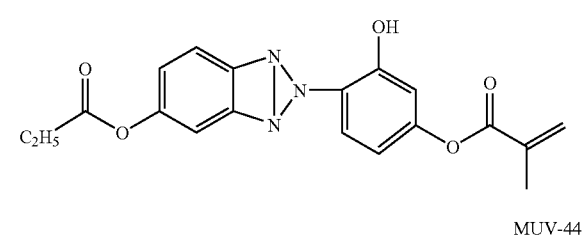
MUV-44
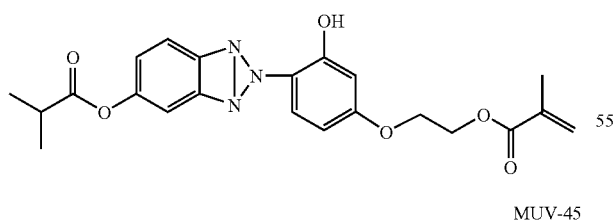
MUV-45
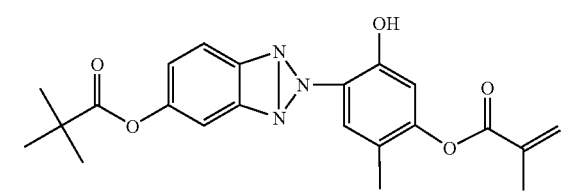
MUV-46
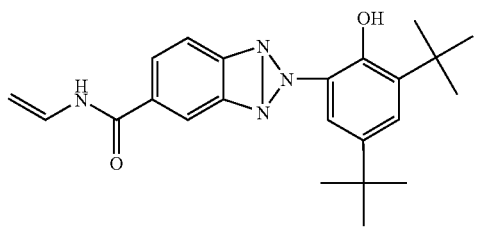
MUV-47
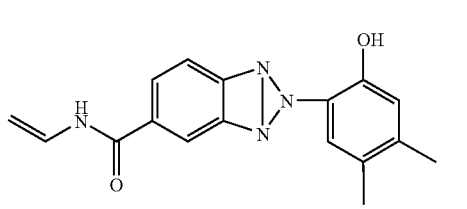
MUV-48
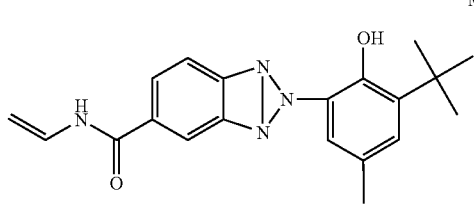
MUV-49
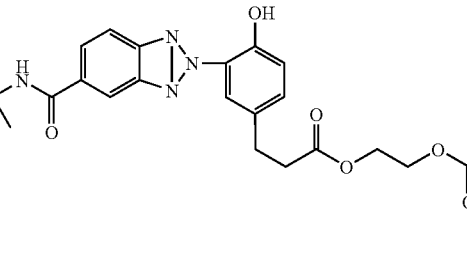
MUV-50
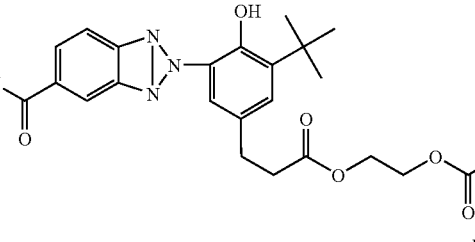
MUV-51
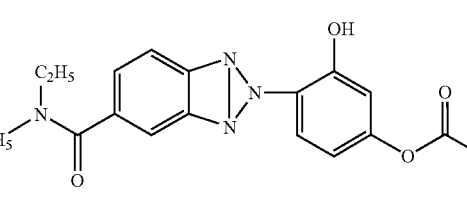
MUV-52
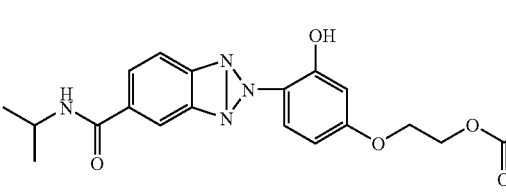

MUV-53

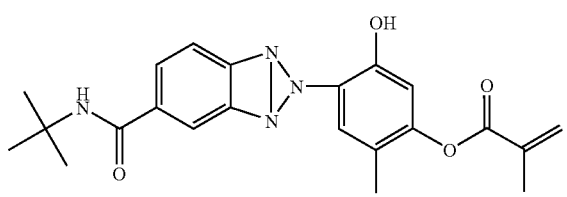

The UV absorbent used in this invention can be synthesized using an ultraviolet light absorbing monomer or an intermediate thereof which is disclosed in a known reference. Examples of documents which can be referred to for synthesizing the UV absorbent include U.S. Pat. Nos. 3,072,585, 3,159,646, 3,399,173, 3,761,272, 4,028,331, and 5,683,861, European Patent No. 86,300,416, JP-A Nos. 63-227575 and 63-185969, Polymer Bulletin V. 20 (2), 169-176 and Chemical Abstracts V. 109, No. 191389.

When the UV absorbent and the ultraviolet light absorbing polymer used in this invention are mixed with the other transparent polymer, a low molecular weight compound, a high molecular weight compound or an inorganic compound may be used together as necessary. For example simultaneously mixing the UV absorbent used in the invention and another low molecular weight UV absorbent with another transparent polymer and mixing the ultraviolet light absorbing polymer used in the invention and the other low molecular weight UV absorbent with another transparent polymer is one preferable aspect of this invention. In the same manner, simultaneously mixing additives such as antioxidants, plasticizers and flame retardants are of another preferable aspect of this invention.

The UV absorbent and the ultraviolet light absorbing polymer used in this invention may be added to a cellulose ester film by being included in the cellulose ester film or by being coated on the cellulose ester film. In the case of inclusion in the cellulose ester film, direct addition and in-line addition for which the production properties are excellent are favorable. The in-line addition is a method in which the UV absorbent and the ultraviolet light absorbing polymer are dissolved beforehand in an organic solvent (such as methanol, ethanol, methylene chloride and the like) and dissolved, and then added to the dope composition using an in-line mixer or the like.

The amount of the UV absorbent and the ultraviolet light absorbing polymer used in this invention is not fixed and depends of type of compound and the conditions for use. However, in the case of the UV absorbent, for 1 $m^2$ of optical film, the amount is preferably in the range of 0.2-3.0 g, more preferably 0.4-2.0 g and 0.5-1.5 g is particularly preferable. In the case of the ultraviolet light absorbing polymer, for 1 $m^2$ of optical film, it is preferably in the range of 0.6-9.0 g, more preferably 1.2-6.0 g and even more preferably 1.5-3.0 g.

From the viewpoint of preventing deterioration of the liquid crystal, a substance in which absorbance of ultraviolet light having a wavelength of no more than 380 nm is excellent, and from the viewpoint of favorable liquid crystal display properties a substance with little absorbance of visible light below 400 nm is preferable. In this invention, it is preferable that at a wavelength of 380 nm, transparency is not more than 8%, and preferably not more than 4% and transparency of not more than 1% is particularly preferable.

The commercially available products that can be used in this invention as the UV absorbent include UVM-1 which is 1-(2-benzotriazole)-2-hydroxy-5-(2-vinyl oxycarbonyl ethyl) benzene, and reaction type UV absorbent RUVA-93-1 manufactured by Otsuka Chemical Company which is 1-(2-benzotriazole)-2-hydroxy-5-(2-methacryloyl oxyethyl)benzene or similar compounds. Polymers or copolymers of homopolymers may be used, but examples are not limited thereto. For example, PUVA-30M manufactured by Otsuka Chemical Co., Ltd is preferably used as the commercially available high molecular weight UV absorbent. Two or more types of the UV absorbent may be used. The method for adding the UV absorbent to the dope may be by dissolving the UV absorbent in an organic solvent such as alcohol, methyl chloride or dioxolane or methyl acetate, and then adding it to the dope, or alternatively the UV absorbent may be directly added to the dope composition.

An antioxidant may be included in the cellulose ester film of this invention. For example as described in JP-A No. 5-197073, a peroxide decomposing agent, a radical chain-linking agent, or metal deactivator or an acid trapping agent may also be included. The amount in which these compounds are added is preferably in a weight ratio of 1 ppm-1.0%, and more preferably 10-1,000 ppm to the cellulose ester.

In this invention, it is preferable that a matting agent containing particles is included in the cellulose ester film, and examples of the matting agent include particles of inorganic compounds such as silicon dioxide, titanium dioxide, aluminum oxide, zirconium oxide, calcium carbonate, kaolin, talc, burned calcium silicate, hydrated calcium silicate, aluminum silicate, magnesium silicate, and calcium phosphate or cross-linked polymer particles. Of these, silicon dioxide is preferable in view of reduced haze in the film. The average particle diameter of the secondary particles is preferably in the range of 0.01-1.0 μm and the amount of these particles included is preferably in the range of 0.005-0.3% by weight of the cellulose ester. The particles such as the silicon dioxide particles are often surface treated using an organic substance, and this is preferable because it reduces haze in the film. Examples of the organic compound used in the surface treatment include halogens, alkoxysilanes (particularly alkoxysilanes having a methyl group), silazanes, and siloxanes. Particles having a larger average particle diameter have a greater matting effect, while particles having a smaller average particle diameter have excellent transparency. Thus among the particles, the primary particles preferably have an average primary particle size of 5-50 nm, and more preferably 7-16 nm. These particles are usually present in the cellulose ester film as an aggregate, and preferably form irregularity of 0.01-1.0 μm in the plane of the cellulose ester film. Examples of the silicon dioxide particles include Aerosil 200, 200V, 300, R972, R972V, R974, R202, R812, OX50, or TT600 (each manufactured by Aerosil Co., Ltd.), and of these, Aerosil 200V, R972, R972V, R974, R202, and R812, are preferred. Two or more of these matting agents may be combined and used. In the case where 2 or more matting agents are used, they may be mixed in a suitably selected proportion. In this case, matting agents which have different particle size and quality such as Aerosil 200V and R927V may be used in weight proportions in the range from 0.1:99.9 to 99.9:0.1.

Next, a manufacturing method of a cellulose ester film in the present invention will be described.

Next the method for preparing the cellulose ester dope of this invention will be described. Flakes of cellulose ester are stirred into the dissolution vessel with an organic solvent, which is the main good solvent for the cellulose ester, and thereby dissolved and the dope is formed. Examples of the dissolution method include a method which is performed at normal pressure; a method which is performed below the boiling point of the main solvent; a method which is performed by applying pressure below the boiling point of the main solvent; a method which is performed by cold dissolution as described in Japanese Patent O.P.I. Publication No. 9-95544, 9-95557, or 9-95538; and various dissolution methods performed under high pressure as disclosed in Japanese Patent O.P.I. Publication No. 11-21379. After dissolution, the dope is filtered with a filtering material and then defoamed and sent to the next step. The cellulose ester concentration in the dope is between 10 and 35% by weight, and more preferably between 15 and 25%. In order to include the polymer useful in this invention in a cellulose ester dope, the polymer is dissolved beforehand in an organic solvent and then added to the cellulose ester dope, and the method for addition, such as direct addition and the like is not limited. In this case the addition is done such that there is no cloudiness or phase separation of the polymer in the dope. The amount to be added is as described above.

Examples of good solvents of the cellulose ester include organic solvents such as, methyl acetate, ethyl acetate, amyl acetate, ethyl formate, acetone, cyclohexanone, methyl acetoacetata, tetrahydrofuran, 1,3-dioxolane, 4-methyl-1,3-dioxolane, 1,4-dioxane, 2,2,2-trifluoroethanol, 2,2,3,3-hexafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, nitroethane, 2-pyrrolidone, N-methyl-2-pyrrolidone, 1,3-dimethyl-2-imidazolidinone, methylene chloride, and bromopropane. Of these, methyl acetate, acetone and methylene chloride are preferably used. Lower alcohols such as methanol, ethanol, butanol and the like can be favorably used along with these organic solvents, since they can improve the solubility of the cellulose ester in the organic solvent and reduce the viscosity of the dope. It is preferable that organic solvent used with the dope of this invention is a mixture of a good solvent and a poor solvent for cellulose ester in view of production efficiency, and a favorable range of proportion for mixing the good solvent and the poor solvent is 70-98% by weight of the good solvent and 2-30% by weight of the poor solvent. A good solvent in this invention is defined as a solvent that will dissolve the cellulose ester that is used on its own while a poor solvent is one that does not dissolve the cellulose ester on its own. The poor solvent used with the dope of this invention is not particularly limited, but examples of the solvent that is preferably used include methanol, ethanol, n-butanol, cyclohexane, cyclohexanone and the like. Selection of the organic solvent for the polymer used in this invention is also preferably a good solvent for cellulose ester. As described above, in the case where the low molecular weight plasticizer is used, conventional method for addition may be used and the plasticizer may be added directly to the dope or dissolved in an organic solvent beforehand and then poured into the dope.

When the various additives described above are added to the cellulose ester dope, it is preferable that a solution in which the cellulose ester dope and the various additives are dissolved in a small amount of the cellulose ester is blended by in-line addition. For example, an in-line mixer such as static mixer SWJ (Toray static in-line mixer, Hi-Mixer, manufactured by Toray Engineering) is preferably used. In the case where the in-line mixer is used, it is preferably applied to a dope in which the cellulose ester is subjected to concentrated dissolution under high pressure and in this case, a specific type of pressurizing container is required which is capable of withstanding a prescribed pressure, and which can be heated under pressure and in which stirring can be performed.

In this invention, by filtering the cellulose ester dope, foreign matter, particularly foreign matter that can be mistakenly identified as images in the liquid crystal image display device, are removed. It can be said that the quality of the polarizing plate protective film is determined by this filtration. It is preferable that the absolute filtration accuracy of the filtering material used in this filtration is small, but if the absolute filtration accuracy is too small, there is clogging of the filtration material is likely to occur, and thus the filtering material must be replaced frequently and this causes the problem of reduced productivity. As a result, the absolute filtration accuracy of filtering material for the cellulose ester dope of this invention is preferably in the range not mote than 0.008 mm, more preferably in the range of 0.001-0.008 mm, and still more preferably in the range of 0.003-0.006 mm. The quality of the filtering material is not particularly limited, and conventional filtering materials may be used. However, filtering material made from plastic fibers such as polypropylene, Teflon (registered trademark) and the like or filtering material made of metals such as stainless steel are preferable in the view of the fact that there is no falling out of the fibers. Filtration of the cellulose ester dope of this invention can be performed using conventional methods, but a method in which filtration is performed while heating under reduced pressure at a temperature which is less that the boiling point of the solvent at atmospheric pressure, and which is within a range in which the solvent does not boil is preferred in view of the fact that increase in differential pressure after filtration (referred to as filtration pressure hereinafter) is small. The preferable temperature range is 45-120° C., more preferably 45-70° C., and still more preferably 45-55° C. The filtration pressure is preferably small. The filtration pressure is preferably no greater than $1.6 \times 10^6$ Pa, more preferably no greater than $1.2 \times 10^6$ Pa, and still more preferably, no greater than $1.0 \times 10^6$ Pa. Including an unsubstituted acyl group or a cellulose ester with a low degree of substitution in raw material for the cellulose ester, sometimes causes foreign material obstruction (sometimes called brightness point hereinafter). A polarizing film was placed between two cellulose ester film samples arranged in a crossed state (crossed Nicol state). The brightness point is a phenomenon which occurs when light was irradiated from one side and observed from the other side using an optical microscope (50 magnification) and if the cellulose ester film is a normal one, light is blocked and there is darkness and nothing can be seen, while if foreign material is present, light leaks from that area and brightness appears as spots. Actual damage when the cellulose ester film is used as a liquid crystal image display device is large to the extent that that the diameter of the brightness point is large, and the diameter of the brightness point should be no greater than 50 µm, preferably no greater than 10 µm, and still more preferably no greater than 8 µm. It is to be noted that the diameter of the brightness point is the diameter that is measured when the brightness point is approximated to a perfect circle. If the diameter of the brightness point defined here is 400/cm² or less, there are no problems in terms of practical use, the diameter is preferably 300/cm² or less, and more preferably 200/cm² or less. In order to reduce the amount and size of these brightness spots, it is necessary to properly filter fine foreign material. Also, as described in Japan Patent Application Laid-Open No. 2000-137115, the method in which a crushed cellulose ester film which has been formed are added again in the proportion of the dope and used as the materials for the cellulose ester and the additives is preferably used as the brightness spots are reduced.

Next, the process for casting the cellulose ester dope on a metal support, the drying process for drying on the metal support, and the peeling process for peeling the web from the metal support will be described. The metal support body is an endless metal belt which can move infinitely or a rotating metal drum with the surface thereof being a mirror surface.

The casting process is one in which a dope is pumped to a pressure die through a pressure type metering gear pump, and cast from the pressure die onto a metal support at a casting position. Another casting process is a doctor blade method in which the thickness of the cast dope film is adjusted with a blade or a method using reverse roll coater in which the dope thickness of the cast dope is adjusted with a reverse roller coater rotating reversely. A pressure die is preferred in view of the fact that the slit shape at the opening portion can be regulated and the film thickness is readily regulated to be uniform. Examples of the pressure die include a coat hanger die, a "T" die, and the like, and any of these maybe favorably employed. In order to increase the casting speed, two or more pressure dies may be provided on the metal support and dopes divided into two or more may be cast on the metal support and the dope amount may be divided and layered. The thickness of the film may be controlled to a desired thickness by controlling the dope concentration, the amount of dope pumped, the space of the slit in the die opening, the push-out pressure of the die, the speed of the metal support body and the like.

The drying process performed on the metal support is one in which a web (a dope film which is formed after a dope is cast on a metal support is called a web) is heated on a support and solvents are evaporated. Methods for evaporating solvents, include a method in which hot air is blown from the web side and the backside of the support, a method in which heating is carried out from the back surface of the support using heat transfer by liquid, and a method in which heating is carried out from the surface as well as the back surface using heat radiation. Further, these methods are preferably combined. If the web is thin, drying is quick. The temperature of the support may be the same along the entire support or may be different depending on the position.

The method for performing drying on the metal support which is used in this invention, is preferably a method in which casting is done on the metal support at a temperature of 0-40° C., and more preferably at a temperature of 5-30° C. The air for drying the web is preferably 30-45° C., but is not limited thereto.

The peeling process is one in which a web, in which the organic solvents have been evaporated on the support, is peeled prior to conveying of the metal support. The peeled web is sent to the drying process. The position at which the web is peeled from the metal support is called the peeling point, and the rollers which aid in the peeling are called peeling rollers. This phenomenon depends on the thickness of the web, but when the residual solvent amount (represented by the formula described below) is too large, it may be difficult to peel the web. On the contrary, when peeling is carried out after fully drying the web on the support, a part of the web may peel before the peeling position. It is generally preferable that web peeling is performed when the residual solvent amount is 20 to 150% by weight. The residual solvent amount in this invention when the film is peeled is preferably 20-40% by weight or 60-120% by weight, and 20-30% by weight or 70-115% by weight is particularly preferable. One method for increasing the speed of film production (the film production speed can be increased because the peeling is performed when the residual solvent amount is a much as possible) is a gel casting method in which peeling can be done even when the residual solvent amount is high. The gel casting methods include a method in which poor solvents with respect to the cellulose ester are added to a dope and gelling is carried out after casting the dope, and also a method in which gelling is carried out by decreasing the temperature of a support, and the like. There is further a method in which metal salts are added to the dope. By strengthening the web film through gelling the dope on the support, it is possible to carry out earlier peeling and to increase the film formation speed. When the peeling is carried out at the time when the residual solvent amount is still great, the web may be too soft, and during peeling, the flatness of the web is compromised, and formation of wrinkles and longitudinal streaks due to the peeling tension become likely. Accordingly, the residual solvent amount is determined such that economic operation and quality are balanced.

The residual solvent amount used in this invention is expressed by the formula below.

Residual solvent amount (% by weight)=$\{(M-N)/N\}\times 100$

In the formula, M represents the weight of the web at a suitably selected point and N represents the weight when M is dried for 3 hours at 110° C.

Furthermore, it is preferable that in the process for drying the cellulose ester film, the film that has been peeled from the support is further dried to cause the residual solvent amount to 2.0% by weight or less, and more preferably 1.0% by weight or less, and still more preferably 0.5% by weight or less.

In the web drying process, the web is dried by employing a method in which the web is conveyed through a staggered rolling and drying device or a tenter drying device in which the web is conveyed while holding both edges of the web using clips and maintaining web width or slightly stretching the web in the width direction. In this invention, it is particularly favorable to maintain or stretch the web width in a suitably selected process subsequent to peeling of the web by the tenter drying device and at a suitably selected point where the residual solvent amount is great, since humidity stability of the optical properties are favorable. The means for drying the web is not particularly limited and the drying is generally carried out by hot air, infrared rays, heat rolling or microwaves. It is preferable that the drying is performed by hot air in view of simplicity. The drying temperature is preferably gradually increased in the range from 40 to 180° C. and more preferably in the range from 50 to 160° C. The drying process preferably has a process in which a thermal treatment at a temperature of 140 to 180° C., since retardation values Rt and Ro are possibly lowered.

The cellulose ester film of the present invention is preferably stretched by 1% or more both in MD (the film transport direction) and TD (the transverse direction orthogonal to MD), in order to obtain sufficient flatness of the film. For obtaining a film having little difference in in-plane retardation values, the stretching ratios in MD and in TD are preferably similar, however, those may be different. The sum of the stretching ratios in MD and in TD is arbitrarily controlled, since a smaller sum of the stretching ratios results in a smaller Rt value. In view of obtaining a smaller Rt value, the stretching temperature is preferably smaller in any stretching process.

It is to be noted that the stretching operation may be performed in a number of stages and the web is preferable stretched biaxially in the casting direction and the width direction. Furthermore, biaxial stretching may be performed simultaneously or stepwise. In this case stepwise means that, for example, stretching in different directions can be performed sequentially, or stretching in the same direction can be performed in many stages and then the stretching in the different direction is added at the end of any of those stages.

It is preferable that the cellulose ester film is thin, because the resulting polarizing plate is also thin, and this causes a thin liquid crystal display film to be readily achieved. However if the film is too thin, transparency and tear strength deteriorate. The thickness of the cellulose ester film that achieves a balance between the above two conditions is preferably 10-100

µm, more preferably 10-80 µm, still more preferably 10-60 µm, and specifically preferably 20-45 µm.

The width of the cellulose ester film is preferably not less than 1.4 m, and more preferably in the range of 1.4-4 m in view of productivity in that a large liquid crystal display is obtained.

The cellulose ester film of the present invention is preferably used as a polarizing plate to be used in various liquid crystal displays. The cellulose ester film of the present invention is characterized in that the cellulose ester film provided closer (provided between polarizing plate (A) and the brightness enhancing film) to the brightness enhancing film has an in-plane retardation value Ro(550) represented by Formula (I) is in the range of 0-5 nm and a retardation value in the thickness direction Rt(550) represented by Formula (II) is in the range of −15-15 nm.

$$Ro(550)=(Nx-Ny)\times d \quad \text{Formula (I)}$$

$$Rt(550)=\{(Nx+Ny)/2-Nz\}\times d \quad \text{Formula (II)}$$

wherein Nx and Ny each represents the maximum and minimum value of the in-plane refractive index of the film; Nz represents the refractive index in the thickness direction; d represents the thickness (nm) of the film; Ro(550) and Rt(550) each represent the retardation value measured at a wavelength of 550 nm.

The cellulose ester film provided between polarizing plate (A) and the brightness enhancing film exhibits the following retardation values: Ro(400) and Ro(700) each are in the range of 0 to 5 nm; and Rt(400) and Rt(700) each are in the range of −15 to 15 nm, provided that Ro(400) represent an in-plane retardation value measured at a wavelength of 400 nm; Ro(700) represent an in-plane retardation value measured at a wavelength of 700 nm; Rt(400) represent a retardation value in the thickness direction measured at a wavelength of 400 nm; and Rt(700) represent a retardation value in the thickness direction measured at a wavelength of 700 nm.

The retardation values Ro(400), Ro(550), Ro(700), Rt(400), Rt(550) and Rt(700) can be determined using an automatic birefringence meter by changing the wavelength for measuring. For example, the retardation values can be measured using KOBRA-21ADH (produced by Oji Scientific Instruments) under a condition of 23° C. and 55% RH.

The polarizing plate protective film on the backlight side of polarizing plate (A) is exposed to a high temperature which tends to result in variation and non-uniformity of the retardation value, whereby problems have occurred in which the uniformity of brightness tends to vary. In the present invention, it is preferable for overcoming the above problems to provide a hard coat layer containing the following actinic ray curable resin on the surface of the cellulose ester film.

(Actinic Ray Curable Resin Layer)

An actinic ray curable resin layer used as a hard coat layer will now be described.

The actinic ray curable resin layer refers to a layer which contains, as a main component, a resin cured through a crosslinking reaction when exposed to actinic rays such as UV light or electron beams. The actinic ray curable resin layer preferably contains an ethylenically unsaturated monomer, which is exposed to actinic rays such as UV light or electron beams and cured to form a hard coat layer. Listed as representative actinic ray curable resins are UV curable resins as well as electron beam curable resins. The actinic ray curable resin is preferably a UV curable resin.

Listed as UV curable resins may be, for example, UV curable urethane acrylate resins, UV curable polyester acrylate resins, UV curable epoxy acrylate resins, UV curable polyol acrylate resins, or UV curable epoxy resins.

The UV curable urethane acrylate resins are easily prepared in such a manner that acrylate based monomers having a hydroxyl group such as 2-hydroxyethyl acrylate, 2-hydroxyethyl methacrylate (hereinafter, acrylate includes acrylate itself and methacrylate, and acrylate represents both), or 2-hydroxypropyl acrylate are allowed to react with the product which is commonly prepared by allowing polyester polyols to react with isocyanate monomers or prepolymers. For example, those described in Japanese Patent O.P.I. Publication No. 59-151110 can be used.

For example, preferably employed is a mixture comprising 100 parts of Unidick 17-806 (manufactured by Dainippon Ink and Chemicals Inc.) and one part of Coronate L (manufactured by Nippon Urethane Industry Co., Ltd.).

The UV ray curable polyesteracrylate resins include those prepared easily by reacting a polyesterpolyol with 2-hydroxyethylacrylate or 2-hydroxypropylacrylate, disclosed for example, in Japanese Patent O.P.I. Publication No. 59-151112.

Examples of the UV ray curable epoxyacrylate resin include those prepared by reacting an epoxyacrylate oligomer in the presence of a reactive diluting agent and a photoinitiator, disclosed for example, in Japanese Patent O.P.I. Publication No. 1-105738.

Examples of the UV ray curable polyol acrylate resin include trimethylolpropane triacrylate, ditrimethylolpropane tetraacrylate, pentaerythritol triacrylate, pentaerythritol tetraacrylate, dipentaerythritol hexaacrylate or alkyl-modified dipentaerythritol pentaacrylate.

The photoinitiators for the UV ray curable resins include benzoine or its derivative, or acetophenones, benzophenones, hydroxy benzophenones, Michler's ketone, α-amyloxime esters, thioxanthones or their derivatives. an oxime ketone derivative, a benzophenone derivative or a thioxanthone derivative. These photoinitiators may be used together with a photo-sensitizer. The above photoinitiators also work as a photo-sensitizer. Sensitizers such as n-butylamine, triethylamine and tri-n-butylphosphine can be used in photo-reaction of epoxyacrylates. The content of the photoinitiators or sensitizers in the UV ray curable resin layer is 0.1 to 15 parts by weight, and preferably 1 to 10 parts by weight, based on the 100 parts by weight of the UV ray curable resin layer.

The polymerizable monomers having one unsaturated double bond in the molecule include methyl acrylate, ethyl acrylate, butyl acrylate, benzyl acrylate, cyclohexyl acrylate, vinyl acetate, and styrene. The polymerizable monomers having two or more unsaturated double bonds in the molecule include ethylene glycol diacrylate, propylene glycol diacrylate, divinylbenzene, 1,4-cyclohexane diacrylate, 1,4-cyclohexyldimethyl diacrylate, trimethylol propane triacrylate, and pentaerythritol tetraacrylate.

The UV curable resins available on the market utilized in the present invention include Adekaoptomer KR, BY Series such as KR-400, KR-410, KR-550, KR-566, KR-567 and BY-320B (manufactured by Asahi Denka Co., Ltd.); Koeihard A-101-KK, A-101-WS, C-302, C-401-N, C-501, M-101, M-102, T-102, D-102, NS-101, FT-102Q8, MAG-1-P20, AG-106 and M-101-C (manufactured by Koei Kagaku Co., Ltd.); Seikabeam PHC2210(S), PHC X-9(K -3), PHC2213, DP-10, DP-20, DP=30, P1000, P1100, P1200, P1300, P1400, P1500, P1600, SCR900 (manufactured by Dainichiseika Kogyo Co., Ltd.); KRM7033, KRM7039, KRM7131, UVECRYL29201 and UVECRYL29202 (manufactured by Daicel U. C. B. Co., Ltd.); RC-5015, RC-5016, RC-5020, RC-5031, RC-5100, RC-5102, RC-5120, RC-5122, RC-5152, RC-5171, RC-5180 and RC-5181 (manufactured by Dainippon Ink & Chemicals, Inc.); Olex No. 340 Clear (manufactured by Chyugoku Toryo Co., Ltd.); Sunrad H-601, RC-750, RC-700, RC-600, RC-500, RC-611 and RC-612 (manufactured by Sanyo Kaseikogyo Co., Ltd.); SP-1509 and SP-1507 (manufactured by Syowa Kobunshi Co., Ltd.); RCC-15C (manufactured by Grace Japan Co., Ltd.) and Aronix M-6100, M-8030 and M-8060 (manufactured by Toagosei Co., Ltd.).

Concrete examples include trimethylol propane triacrylate, ditrimethylol propane tetracrylate, pentaerythritol triacrylate, pentaerythritol tetracrylate, dipentaerythritol hexaacrylate and alkyl modified dipentaerythritol pentaacrylate.

These actinic ray curable resin layers can be applied by any method well known in the art, for example: a gravure coater, a dip coater, a reverse coater, a die coater and ink jet printing.

Light sources to cure layers of UV curable-resin by photocuring reaction are not specifically limited, and any light source may be used as far as UV ray is generated. For example, a low-pressure mercury lamp, a medium-pressure mercury lamp, a high-pressure mercury lamp, an ultrahigh-pressure mercury lamp, a carbon arc lamp, a metal halide lamp and a xenon lamp may be utilized. The preferable irradiation quantity of light may be changed depending on the type of lamp, however, it is preferably from 5 to 150 mJ/cm$^2$, and more preferably from 20 to 100 mJ/cm$^2$.

Irradiation of an actinic ray is preferably carried out under tension in the longitudinal direction of the film and more preferably under tension in both the lateral and the longitudinal directions. The preferable tension is from 30 to 300 N/m. The method to provide tension is not specifically limited and following methods are preferably used: (i) a method of providing tension while the film is being transported over back rolls, and (ii) a method using a tenter to give tension in the lateral direction or in biaxial directions. A cellulose ester film exhibiting a superior flatness can be obtained using these methods.

An organic solvent used for a coating solution of a UV curable-resin can be selected from, for example, the hydrocarbon series (toluene and xylene), the alcohol series (methanol, ethanol, isopropanol, butanol and cyclohexanol), the ketone series (acetone, methyl ethyl ketone and isobutyl ketone), the ester series (methyl acetate, ethyl acetate and methyl lactate), the glycol ether series and other organic solvents. These organic solvents may be also used in combination. The above mentioned organic solvents preferably contain propylene glycol monoalkyl ether (the alkyl having 1 to 4 carbon atoms) or propylene glycol monoalkyl ether acetate (the alkyl having 1 to 4 carbon atoms) in an amount of 5% by weight or more, and more preferably from 5 to 80% by weight.

In a coating solution of a UV ray-curable resin, a silicon compound such as a polyether modified silicone oil, is preferably added. The number average molecular weight of the polyether modified silicone oil is preferably from 1,000 to 100,000 and more preferably from 2,000 to 50,000. Addition of the polyether modified silicone oil with a number average molecular weight of less than 1,000 may lower the drying rate of the coating solution, while that of more than 100,000 may be difficult to bleed out at the surface of the coated film.

Silicon compounds available on the market include, for example: DKQ8-779 (a trade name of Dow Corning Corp.), SF3771, SF8410, SF8411, SF8419, SF8421, SF8428, SH200, SH510, SH1107, SH3771, BX16-034, SH3746, SH3749, SH8400, SH3771M, SH3772M, SH3773M, SH3775M, BY-16-837, BY-16-839, BY-16-869, BY-16-870, BY-16-004, BY-16-891, BY-16-872, BY-16-874, BY22-008M, BY22-012M, FS-1265 (all being trade names of Dow Corning Toray Silicone Co., Ltd.), KF-101, KF-100T, KF351, KF352, KF353, KF354, KF355, KF615, KF618, KF954, KF6004, siliconeX-22-945, X22-160AS (all being trade names of Shin-Etsu Chemical Co., Ltd.), XF3940, XF3949 (both being trade names of Toshiba Silicones Co., Ltd.), DISPARLONLS-009 (a trade name of Kusumoto Chemicals Ltd.), GLANOL410 (a trade name of Kyoeisha Chemicals Co., Ltd.), TSF4440, TSF4441, TSF4445, TSF4446, TSF4452, TSF4460 (all being trade names of GE Toshiba Silicones Co., Ltd.), BYK-306, BYK-330, BYK-307, BYK-341, BYK-361 (all being trade names of BYK-Chemie Japan KK), L Series (L-7001, L-7006, L-7604 and L-9000), Y Series and FZ Series (FZ-2203, FZ-2206 and FZ-2207) (all from Nippon Unicar Co., Ltd.).

These compositions may improve the coating ability of a coating solution onto a substrate or an under coat layer. These compounds used in the top layer of film may contribute to improvement of scratch resistance of the film as well as water-resistance, oil-resistance and anti-stain properties of the film. The content of the silicon compound is preferably from 0.01 to 3% by weight based on the solid components in the coating solution.

The aforementioned coating methods are also used as coating method of a UV ray-curable resin layer coating solution. The wet thickness of the coated UV-curable resin layer is preferably from 0.1 to 30 μm and more preferably from 0.5 to 15 μm. The dry thickness of the coated UV-curable resin layer is preferably from 0.1 to 20 μm and more preferably from 1 to 10 μm.

The UV ray-curable resin layer is preferably irradiated with UV rays during or after drying. The duration of UV ray irradiation is preferably from 0.1 seconds to 5 minutes in order to secure the exposure amount from 5 to 150 mJ/cm$^2$ as mentioned above. In view of working efficiency and hardening efficiency of the UV-curable resin layer, the duration is more preferably from 0.1 to 10 seconds.

Intensity of the actinic ray is preferably from 50 to 150 mW/cm$^2$ on the irradiated surface.

The UV-cured resin layer thus obtained may preferably contain inorganic or organic particles in order to attain the following characteristics: (i) preventing blocking, (ii) improving scratch resistance, (iii) providing a light-diffusivity and (iv) optimizing the reflective index.

Examples of inorganic particles used in the hard coat layer include, for example: silicon oxide, titanium oxide, aluminum oxide, zirconium oxide, magnesium oxide, calcium carbonate, talc, clay, calcined kaolin, calcined calcium silicate, hydrated calcium silicate, aluminum silicate, magnesium silicate and calcium phosphate. Among these, silicon oxide, titanium oxide, aluminum oxide, zirconium oxide, magnesium oxide are specifically preferable.

Organic microparticles include, for example: microparticles of polymethacrylic acid methyl acrylate resin, acryl styrene based resin, polymethyl methacrylate resin, silicon based resin, polystyrene based resin, polycarbonate resin, benzoguanamine based resin, melamine based resin, polyolefin based resin, polyester based resin, polyamide based resin, polyimide based resin and polyfluorinated ethylene based resin. Specifically preferable organic microparticles include, for example: microparticles of cross-linked polystyrene (such as SX-130H, SX-200H and SX-350H manufactured by Soken Chemical & Engineering Co., Ltd.) and polymethyl methacrylate (such as MX150 and MX300 manufactured by Soken Chemical & Engineering Co., Ltd.).

The average particle diameter of the microparticles is preferably from 0.005 to 5 μm and specifically preferably from 0.01 to 1 μm. The microparticle content of the hard coat layer is preferably from 0.1 to 30 weight parts per 100 weight parts of the UV-curable resin composition.

It is preferred that the UV curable resin layer is a clear hard coat layer having a center-line average roughness (Ra prescribed by JIS B 0601) of 1 to 50 nm or an anti-glare layer Having an Ra value of from 0.1 to 1 μm. The center-line average roughness (Ra) is preferably measured by means of a surface roughness meter using interference of light, for example, RST/PLUS manufactured by WYKO Co., Ltd. The pencil hardness of UV curable resin layers is commonly H-8H, but is preferably 2H-4H. Pencil scratching test hardness (being pencil hardness) is determined as follows. The resultant hard coat film sample is rehumidified at 25° C. and 60% relative humidity for two hours. Thereafter, based on the pencil hardness test method specified in JIS K 5400, by employing the test pencils, the sample is scratched 10 times under a load of 1 kg, employing each of the above pencils and the number of scratches which result in no abrasion is recorded.

(Brightness Enhancing Film)

Employed as a brightness enhancing film is a polarized light conversion component which exhibits functions which separate the light emitted from a backlight to transmission polarized light and reflected polarized light, or scattered polarized light. Such a brightness enhancing film is capable of enhancing the outgoing efficiency of linear polarized light, utilizing the returning light of the backlight of the reflected polarized light or scattered polarized light.

For example, an anisotropic reflection polarizer is cited as a brightness enhancing film. Cited as such an anisotropic reflection polarizer is a thin anisotropic multilayer film which transmits linear polarized light in a specific vibration direction but reflects linear polarized light in the other vibration directions. For example, cited as such an anisotropic multilayer film is DBEF (refer, for example, to JP-A No. 4-268505), produced by 3M. Further cited as the anisotropic reflection polarizer is the composite of a cholesteric liquid crystal layer and a λ/4 plate, which includes PCF (refer, for example, to JP-A No. 11-232130), produced by Nitto Denko Co. Still further cited as an anisotropic reflection polarizer is a reflection grid polarizer, which includes a metal lattice reflection polarizer (refer to U.S. Pat. No. 6,288,840) which is prepared in such a manner that metal is subjected to fine machining to result in reflection polarized light even in the visible light region, and a product (refer to JP-A No. 8-184701), which is prepared in such a manner that minute metal particles are placed in a polymer matrix, followed by stretching.

Further cited as a brightness enhancing film is an anisotropic scattering polarizer, which includes DRPF (refer to U.S. Pat. No. 5,825,543), produced by 3M.

Still further cited as a brightness enhancing film is a polarizer capable of achieving polarization conversion in a single pass, examples of which include those employing smectic C* (refer to JP-A No. 2001-201635). Further employed as a brightness enhancing film may be an anisotropic diffraction grating.

Adhesives to allow a polarizing plate to adhere onto a brightness enhancing film are not particularly limited. It is possible to appropriately employ any of the base polymers which are composed of polymers such as acryl based polymers, silicone based polymers, polyesters, polyurethanes, polyamides, polyvinyl ethers, vinyl acetate/vinyl chloride copolymers, modified polyolefin, or rubber based polymers such as epoxy based, fluorine based, natural, or synthetic rubber. Specifically preferably employed are those which exhibit excellent optical transparency, desired wettability, coagulation property, and adhesion property, and excellent weatherfastness and heat resistance.

It is possible to incorporate, into the above adhesives, crosslinking agents corresponding to base polymers. Further incorporated into the adhesives may be additives which include resins such as natural or synthetic resins, especially adhesion providing resins; fillers composed of glass fiber, glass beads, metal powder, or other inorganic powders; pigments, colorants, and antioxidants. Further added may be a minute particle incorporating adhesive layer which results in light diffusion.

Adhesives are commonly employed in the form of an adhesive liquid composition prepared by dissolving or dispersing base polymers or their composition in solvents. Appropriately selected and employed as solvents may be organic solvents such as toluene or ethyl acetate, and water, depending on the type of adhesives.

(Polarizing Plate)

The polarizing plate of the present invention, and the liquid crystal display of the present invention employing the same, will now be described.

It is possible to prepare polarizing plate (A) of the present invention employing conventional methods. The cellulose ester film of the present invention is adhered, employing a completely saponified type polyvinyl alcohol aqueous solution, to both sides of a polarizer prepared by alkali-saponifying at least one side of film and stretching the treated film, while immersed in an iodine solution.

As used herein, a "polarizer", which is the major constituting component of the polarizing plate, is the component which only transmits light in a plane of polarization in the definite direction. Currently known representative polarizers include polyvinyl alcohol based polarizing films, which are divided into two types, one prepared by dying a polyvinyl alcohol based film with iodine, and the other prepared by dying the same with dichroic dyes. Polarizers are prepared in such a manner that an aqueous polyvinyl alcohol solution is cast and the resultant film is uniaxially stretched, followed by dying, or the resultant film is dyed followed by uniaxial stretching. Further preferably employed are those which are subjected to endurance treatment, employing boron compounds. The film thickness of polarizers is commonly 4-40 μm, is preferably 5-30 μm, but is most preferably 5-25 μm. A polarizing plate is prepared by allowing the cellulose ester film of the present invention to adhere onto the surface of the above polarizer. Adhesion is preferably carried out employing water based adhesives which are composed of completely saponified polyvinyl alcohol as a major component. Further, in the case of resinous films, other than cellulose ester films, which exhibit low saponification adaptability, it is possible to allow the film to adhere to a polarizing plate via a suitable adhesion layer.

Since a polarizer is stretched in one axial direction (commonly the longitudinal direction), under high temperature and high humidity, it contracts in the stretching direction (commonly being in the longitudinal direction), while it lengthens in the lateral direction against stretching. As the thickness of a polarizing plate protective film decreases, the elongation and contraction ratio increases. Specifically, the degree of contraction of the polarizer in the stretching direction is marked. Commonly, since a polarizer is adhered to a polarizing plate protective film so that the stretching direction of the polarizer is the same as the machine-casting direction (the MD direction), in the case of the decrease in thickness of the polarizing plate protective film, it is critical to decrease the elongation and contraction ratio in the machine casting direction. Since the cellulose eater films employed in the present invention exhibit excellent dimensional stability, they are suitably employed as such a polarizing plate protective film.

Further, it is possible to constitute the polarizing plate in such a manner that a protective film is adhered to one side and a separable film is adhered to the other side. The protective film and the separable film are employed to protect the polarizing plate during shipment and product inspection. In such a case, the protective film is adhered to protect the surface of the polarizing plate and adhered to the side opposite the side on which a liquid crystal plate will be adhered. Further, the separable film is employed to cover the adhesion layer which is adhered onto the liquid crystal plate.

The liquid crystal display of the present invention is composed of a brightness enhancing film, polarizing plate (A), a liquid cell, and polarizing plate (B), which are laminated in the cited order. The feature is that the cellulose ester film of the present invention is provided on the brightness enhancing film side of above polarizing plate (A).

Employed on the other side of each polarizing plate may be the cellulose ester film of the present invention, or another polarizing plate protective film. Employed as a polarizing plate protective film on the other side, with respect to the cellulose ester film of the present invention, may be a commercial cellulose ester film. Preferably employed as such a commercial cellulose ester film are KC8UX2M, KC4UX, KC5UX, KC4UY, KC8UY, KC12UR, KC8UR-3, KC8UCR-4, KC8UCR-5 and KC4FR-1 (all products of Konica Minolta Opto, Inc.), and FUJITAC TD80UF, FUJITAC T80UZ, and FUJITAC T40UZ. Of these, specifically preferable is KC4FR-1.

Further, it is preferable that in polarizing plate (B) employing on the other side, specifically in the polarizing plate protective film on the viewing side, an 8-20 μm thick hard coat layer antiglare layer is provided. For example, preferably employed as a polarizing plate protective film incorporating the hard coat layer or antiglare layer are those described in JP-A Nos. 2003-114333, 2004-203009, 2004-354699, and 2004-354828. Further, it is preferable to incorporate the above antireflection layer incorporating at least a low refractive index layer on a clear hard coat layer or antiglare layer, and it is particularly preferable that the above low refractive index layer incorporates hollow minute particles, such as silicon dioxide.

By mounting the polarizing plate of the present invention on a display device, it is possible to prepare the liquid crystal display of the present invention, which exhibits various types of excellent visibility. The cellulose ester film of the present invention is preferably employed in an LCD employing various driving systems such as a transmission type or semi-transmission type LCD, or a TN type, an STN type, a HAN type, a VA type (being an MVA type, and a PVA type), an IPS type, and an FFS type. Particularly preferably employed are a VA type (an MVA type and a PVA type), an IPS type, and an FFS type liquid crystal displays.

The polarizing plate of the present invention, when employed on the backlight side of the liquid cell of a large image area, exhibits excellent brightness enhancing effects.

Further, to increase the viewing angle of a liquid crystal display, it is preferable that the present invention is combined with the use of polarizing plate (A), polarizing plate (B), and a retardation film between the polarizers. It is possible to select an appropriate retardation value of the retardation film depending on the characteristics of the liquid crystal cells. Further, of protective films of polarizing plate (A) and polarizing plate (B), it is preferable to employ a functional film exhibiting retardation on one side or both sides which faces the liquid crystal cell.

EXAMPLES

The present invention is specifically described with reference to examples, however the present invention is not limited thereto.

(Evaluation Methods)

All evaluation methods related to the present invention will be listed and described.

(Measurement of Molecular Weight)

The weight average molecular weight was determined employing high performance liquid chromatography.

Measurement conditions follow.

Solvent: methylene chloride

Columns: SHODEX K806, K805, and K803G (produced by Showa Denko K.K., the above three columns were connected and then used)

Column temperature: 25° C.

Sample concentration: 0.1% by weight

Detector: RI MODEL 504 (produced by GL Science Co.)

Pump: L6000 (produced by Hitachi, Ltd.)

Flow rate: 1.0 ml/minute

Calibration curve: A calibration curve based on 13 samples of standard polystyrene STK standard polystyrene (produced by TOSOH Corp.) of Mw=1,000,000-500 was employed. Thirteen samples were employed at nearly equal intervals.

(Measurement of Retardations Ro and Rt)

Three-dimensional refractive indices at wavelengths of 400, 550, and 700 nm of film samples were determined under an ambience of 23° C. and 55% relative humidity, employing an automatic birefringence analyzer (KOBRA-21ADH, produced by Oji Scientific Instruments) and refractive indices nx, ny, and nz were recorded. In-plane direction retardation Ro was calculated based on Formula (I), while thickness direction retardation Rt was calculated based on Formula (II).

$$Ro(*) = (Nx - Ny) \times d \qquad \text{Formula (I)}$$

$$Rth(*) = \{(Nx + Ny)/2 - Nz\} \times d \qquad \text{Formula (II)}$$

wherein Nx represents the in-plane delayed phase axis direction refractive index of the sample; Ny represents the refractive index in the direction at right angles to the delayed phase axis in the plane; Nz represents the refractive index in the thickness direction; d represents the thickness (nm) of the film; and "*" represents the wavelength used for the measurement. For example, Ro(400) means that Ro is determined at a wavelength of 400 nm.

Example 1

(Synthesis of Polymer X)

Charged into a glass flask fitted with a stirrer, two dripping funnels, a gas feeding tube, and a thermometer were 40 g of a mixture of Monomers Xa and Xb of the type and ratio described in Table 1, 2 g of mercaptopropionic acid as a chain transfer agent, and 30 g of toluene. The resulting mixture was heated to 90° C. Thereafter, 60 g of the mixture of Monomers Xa and Xb of the type and ratio described in Table 1 was dripped over 3 hours from one dripping funnel, while 0.4 g of azobisisobutyronitrile dissolved in 14 g of toluene was simultaneously dripped from the other dripping funnel over 3 hours. Thereafter, 0.6 g of azobisisobutyronitrile, dissolved in 56 g of toluene, was dripped over 3 hours, followed by reaction for an additional 2 hours, whereby Polymer X was prepared. The weight average molecular weight of Polymer X was determined employing the method described above.

(Synthesis of Polymer Y)

Block polymerization was carried out based on the polymerization method described in JP-A No. 2000-128911. Namely, charged into a flask, fitted with a stirrer, a nitrogen gas feeding pipe, a thermometer, a charging inlet, and a refluxing cooling pipe, was methyl acrylate, described below, and the ambient atmosphere in the flask was replaced by feeding nitrogen gas, and thioglycerol, as described below, was added while stirring.

After the addition of thioglycerol, polymerization was carried out for 4 hours, and the reactants were then cooled to room temperature. Subsequently, polymerization was terminated by the addition of 20 parts by weight of a 5% by weight benzoquinone tetrahydrofuran solution. The content was transferred to an evaporator, and tetrahydrofuran, residual monomers and residual thioglycerol were removed at 80° C. under vacuum, whereby Polymer Y was prepared. The weight average molecular weight of above Polymer Y was determined employing the measurement method described above.

| | |
|---|---|
| Methyl acrylate | 100 parts by weight |
| Thioglycerol | 5 parts by weight |

(Preparation of Cellulose Ester Films 1-6)

| (Preparation of Dope) | |
|---|---|
| Cellulose ester (cellulose triacetate synthesized via cotton linter, of an Mn of 148,000, an Mw of 310,000, Mw/Mn of 2.1, and a degree of substitution of an acetyl group of 2.92) | 100 parts by weight |
| Polymer X | parts described in Table 1 |
| Polymer Y | parts described in Table 1 |
| Methylene chloride | 430 parts by weight |
| Methanol | 40 parts by weight |
| TINUVIN 109 (produced by Ciba Specialty Chemicals Co., Ltd.) | 1.5 parts by weight |
| TINUVIN 171 (produced by Ciba Specialty Chemicals Co., Ltd.) | 0.7 part by weight |
| AEROSIL R972V (produced by Nippon Aerosil Co., Ltd.) | 0.1 part by weight |

The above dope was prepared at the addition ratio of Polymers X and Y, described in Table 1, filtered employing FINE MET NF, produced by Nippon Seisen Co. Ltd., and subsequently, at 22° C., cast onto a stainless steel band support to reach a width of 2 m, employing a belt casting apparatus. The solvents were evaporated so that the residual solvent amount reached 100%, and the resulting web was peeled from the stainless steel band at a peeling tension of 162 N/m. Solvents were evaporated from the peeled cellulose ester web at 35° C., and the resulting web was then slit to a width of 1.6 m. Thereafter, drying was performed at a drying temperature of 140° C., while stretching at a factor of 1.1 was performed in the traverse direction employing a tenter. After stretching, relaxation was carried out at 130° C. in the tenter. Thereafter, drying was completed by conveying the web through 120° C. and 130° C. drying zones employing many rollers. The resulting film was then slit to a width of 1.5 m, and knurling, at a width of 10 mm and a height of 5 μm, was applied to both edges of the film. Subsequently, the resulting film was wound onto a core, of an inner diameter of 6 inches at an initial tension of 220 N/m and a final tension of 110 N/m, whereby Cellulose Ester Films 1-6, described in Table 1, were prepared. The stretching factor in the MD direction, calculated based on the rotation rate of the stainless steel band support and the driving rate of the tenter was 1.1. The residual solvent amount, the thickness, and the roll length of each cellulose ester film were 0.1%, 80 μm, and 4,000 m, respectively. Cellulose Ester Films 7-12 were prepared in the same manner as Cellulose Ester Films 1-6, respectively, except that the thickness of each of Cellulose Ester Films 7-12 was changed from 80 μm to 40 μm, and that some of the contents of Polymer X and Polymer Y were changed as show in Table 1.

TABLE 1

| Cellulose Ester Film No. | Polymer X | | | | Polymer Y | | Content in Film (parts by weight) | | *3 | Ro (400) (nm) | Ro (550) (nm) | Ro (700) (nm) | Rt (400) (nm) | Rt (550) (nm) | Rt (700) (nm) |
|---|---|---|---|---|---|---|---|---|---|---|---|---|---|---|---|
| | Xa Type | *1 | Xb Type | *1 | *2 | Type | *2 | Polymer X | Polymer Y | | | | | | | |
| 1 | MMA | 80 | HEA | 20 | 8500 | MA | 1000 | 12 | 5 | 80 | 1 | 1 | 2 | −1 | −1 | −1 |
| 2 | MMA | 90 | HEMA | 10 | 4000 | MA | 1000 | 12 | 5 | 80 | 0 | 2 | 2 | 0.5 | 0.5 | 0.5 |
| 3 | MMA | 80 | HEA | 20 | 8500 | MA | 1000 | 13 | 7 | 80 | 0.5 | 1 | 1 | −15 | −15 | −15 |
| 4 | MA | 90 | HEMA | 10 | 4000 | MA | 1000 | 10 | 3 | 80 | 0.8 | 1 | 0.6 | 15 | 15 | 15 |
| 5 | MA | 90 | HEMA | 10 | 4000 | MA | 1000 | 18 | 10 | 80 | 0 | 0 | 0 | −18 | −20 | −21 |
| 6 | MA | 90 | HEMA | 10 | 4000 | MA | 1000 | 5 | 2 | 80 | 1.2 | 1 | 0.9 | 18 | 20 | 22 |
| 7 | MMA | 80 | HEA | 20 | 8500 | MA | 1000 | 12 | 5 | 40 | 0.5 | 0.5 | 1 | −0.5 | −0.5 | −0.5 |
| 8 | MMA | 90 | HEMA | 10 | 4000 | MA | 1000 | 12 | 5 | 40 | 0 | 1 | 1 | 0.3 | 0.3 | 0.3 |
| 9 | MMA | 80 | HEA | 20 | 8500 | MA | 1000 | 13 | 7 | 40 | 0.3 | 0.5 | 0.5 | −14 | −15 | −15 |
| 10 | MA | 90 | HEMA | 10 | 4000 | MA | 1000 | 9 | 2 | 40 | 0.4 | 0.5 | 0.3 | 15 | 15 | 15 |
| 11 | MA | 90 | HEMA | 10 | 4000 | MA | 1000 | 20 | 5 | 40 | 0 | 0 | 0 | −18 | −19 | −20 |
| 12 | MA | 90 | HEMA | 10 | 4000 | MA | 1000 | 2 | 2 | 40 | 0.6 | 0.5 | 0.4 | 19 | 20 | 20 |

MA: methyl acrylate,
MMA: methyl methacrylate,
HEMA: 2-hydoxyethyl methacrylate
*1: Ratio (parts by weight),
*2: Weight Average Molecular Weight
*3: Thickness of Cellulose Ester Film (μm)

(Preparation of Polarizing Plate (A))

A 120 μm thick polyvinyl alcohol film was immersed into 100 kg of an aqueous solution incorporating 1 kg of iodine and 4 kg of boric acid, and then stretched at a factor of 6, whereby a polarizer was prepared. One side of the resulting polarizer was allowed to adhere to each of Cellulose Ester Films 1-12, described in Table 1, which had been subjected to alkali saponification under the following conditions, employing, as an adhesive, a 5% aqueous solution of completely saponified type polyvinyl alcohol. Further, the other side of the polarizer was allowed to adhere, in the same manner as above, employing KC8UCR-5, produced by Konica Minolta Opto, Inc., whereby Polarizing Plates (A) 1-12 were prepared.

<Alkali Saponification>

| Process | Reagent | Temp | Time |
|---|---|---|---|
| Saponification Process | 2N—NaOH | 50° C. | 90 seconds |
| Washing Process | water | 30° C. | 45 seconds |
| Neutralization Process | 10 weight % HCl | 30° C. | 45 seconds |
| Washing Process | water | 30° C. | 45 seconds |

Under the above conditions, a film sample was saponified, washed, neutralized, and washed in the cited order, and subsequently dried at 80° C.

(Preparation of Polarizing Plate (B))

Polarizing Plate (B) was prepared in the same manner as above, except that during preparation of the polarizing plate, KC8UCR-5 and KC8UX2M, produced by Konica Minolta Opto, Inc., were employed on both sides as a protective film.

<Brightness Enhancing Film>

DBEF (thin anisotropic multilayer film), produced by 3M Co. was employed.

<Liquid Crystal Cell>

Polarizing plates previously adhered to both sides of 15 type liquid crystal display VL-150SD, produced by FUJITSU LTD., were peeled off for evaluation.

<Preparation of a Liquid Crystal Display>

A brightness enhancing film, each of Polarizing Plates (A) 1-12, a liquid crystal cell, and Polarizing Plate (B) were laminated in the listed order from the backlight side, to prepare Liquid crystal displays 1-12, followed by evaluation. Incidentally, each of Cellulose Ester Films 1-12 was arranged to face the brightness enhancing film of Polarizing Plate (A) and the polarizing plate was arranged so that the absorption axis was in the same direction as that previously arranged in the liquid crystal cell.

Further, Polarizing Plate (B) was arranged so that KC8UCR-5 faced the liquid crystal cell, while the absorption axis of the polarizing plate was arranged to be in the same direction as that previously arranged in the liquid crystal cell.

(Evaluation)

<Determination of Viewing Angle>

To evaluate characteristics of the viewing angle, the transmission light amounts during black display and white display were measured employing EZ-CONTRAST, produced by ELDIM Co. The viewing angle was evaluated based on the value of "contrast" calculated by the following equation:

Contrast=(transmission light amount during white display: cd/cm$^2$)/(transmission light amount during black display: cd/cm$^2$)

Evaluated was the increase in the angle which exhibited a contrast value of 20 in 45° oblique direction in a liquid crystal display panel when the upward direction in the liquid crystal display panel is set to 0° while the display was placed as commonly used. Table 2 shows the results. Further, during the above evaluation, in order to maintain a constant thermal effects, determination was carried out in an environment in which the temperature and humidity were kept constant at 23° C. and 55% RH. Further, employed as a standard was viewing angle evaluation data of the liquid crystal display in which Polarizing Plate (B) was employed on both sides of the liquid crystal cell, instead of using Polarizing Plate (A) on the backlight side (Refer to FIG. 1).

Figure 2:
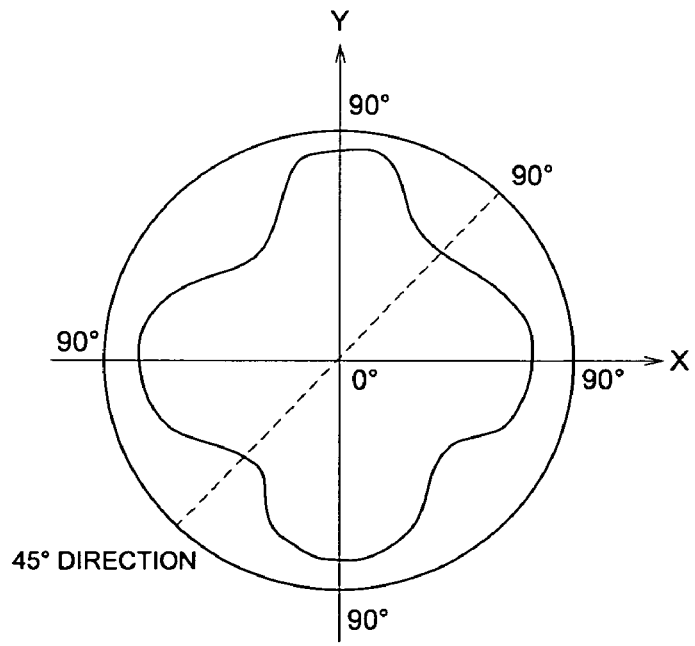
FIG. 2 shows the viewing angle of a liquid crystal display used in the comparative example.
Figure 3:
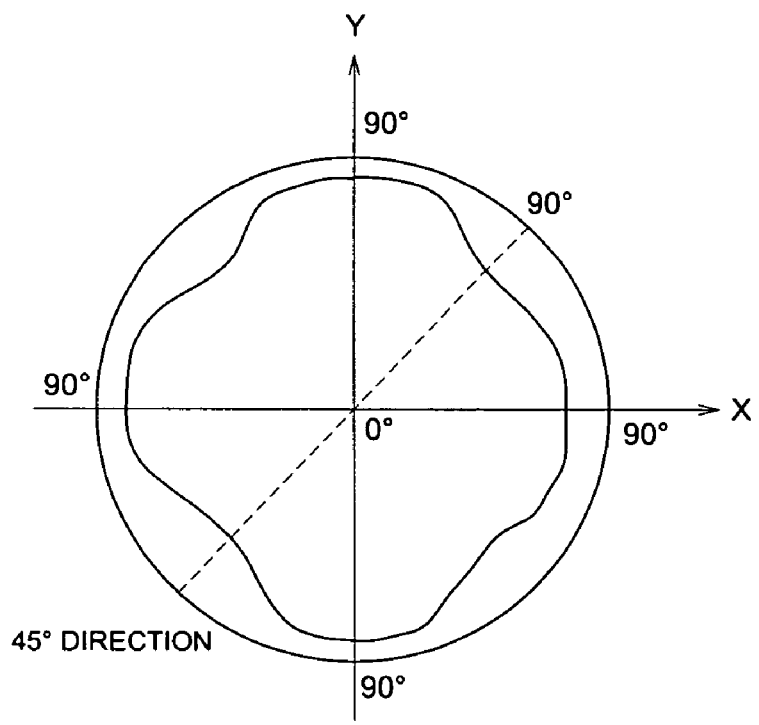
FIG. 3 shows the viewing angle of a liquid crystal display of the present invention employed in the example.
Figure 4:
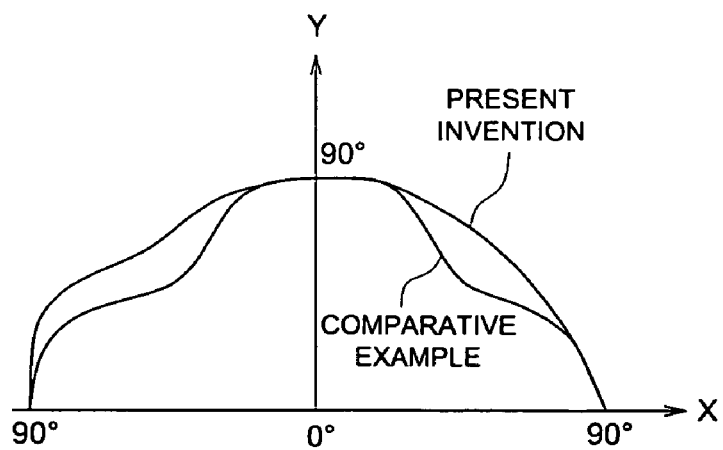
FIG. 4 shows the viewing angles in the 45° direction of a liquid crystal display of the present invention used in the example, and of a liquid crystal display used in the comparative example.

The measurement of transmission light amount will now be explained in more detail. The sensor of EZ-contrast was set on a normal line of a liquid crystal display panel at a certain point (hereafter designated as point A). The sensor was then gradually inclined to a certain direction while heading to point A and keeping the cnstant distance from point A. The transmission light amount was measured incline angles in the range of 0° to 90°, provided that the incline angle was set to 0° when the sensor was on the normal line of the liquid crystal display panel at point A. This measurement was carried out in all the directions of 0 to 360° in the liquid crystal display panel. The same measurements were carried out during both white display and black display. The contrast in each direction at each incline angle was calculated using the measured values. In FIGS. 2-4, Y direction represents 0° direction (upward direction) and X direction represents 90° direction (horizontal direction) in the liquid crystal display panel, and a distance between a certain point and the original point corresponds to the incline angle of the sensor in the direction of the point, wherein each point on the circle in these figures represents the incline angle of 90° in each direction in the display panel. In each figure, the curved line represents the incline angles of the sensor exhibiting a contrast value of 20 in each direction.

As can be seen from Table 2, liquid crystal displays of the present invention resulted in increase in the incline angle giving the contrast value of 20, in the oblique direction of 45°. Further, the viewing angle in the liquid crystal displays of the present invention resulted in an increase, particularly in the 45° direction, compared to comparative examples (refer to FIGS. 2-4).

TABLE 2

| Polarizing Plate (A) No. | Cellulose Ester Film No. on the Brightness Enhancing Film Side | Cellulose Ester Film on the Liquid Crystal Cell Side | Contrast Increase Value | Remarks |
|---|---|---|---|---|
| 1 | 1 | KC8UCR5 | 11° | Present Invention |
| 2 | 2 | KC8UCR5 | 11° | Present Invention |
| 3 | 3 | KC8UCR5 | 9° | Present Invention |
| 4 | 4 | KC8UCR5 | 10° | Present Invention |
| 5 | 5 | KC8UCR5 | 2° | Comparative Example |
| 6 | 6 | KC8UCR5 | 3° | Comparative Example |
| 7 | 7 | KC8UCR5 | 12° | Present Invention |
| 8 | 8 | KC8UCR5 | 13° | Present Invention |
| 9 | 9 | KC8UCR5 | 10° | Present Invention |
| 10 | 10 | KC8UCR5 | 10° | Present Invention |
| 11 | 11 | KC8UCR5 | 2° | Comparative Example |
| 12 | 12 | KC8UCR5 | 1° | Comparative Example |

Example 2

A hard coat layer was applied onto Cellulose Ester Film 2, described in Table 1, based on the following steps.

| <Hard Coat Liquid Composition> | |
| --- | --- |
| Acryl monomer: KAYARAD DPHA (dipentaerythritol hexaacrylate, produced by Nippon Kayaku Co., Ltd.) | 220 parts by weight |
| IRUGACURE 184 (produced by Ciba Specialty Chemicals Co., Ltd.) | 20 parts by weight |
| Propylene glycol monomethyl ether | 110 parts by weight |
| Ethyl acetate | 110 parts by weight |

The above hard coat layer liquid composition was filtered via a polypropylene filter of a core diameter of 0.4 μm and subsequently applied onto Cellulose Ester 2 described in Table 1, employing a micro-gravure coater. After drying the coating at 90° C., the resulting coating was cured under conditions in which by employing a UV lamp, illuminance in the exposed area was set at 100 mW/cm$^2$ and the exposure amount was set at 0.1 J/cm$^2$, and a hard coat layer at a dried layer thickness of 5 μm was formed, whereby Hard Coat Film 1 was prepared.

A liquid crystal display was prepared in the same manner as Example 1, except for the above hard coat layer coating and was then evaluated. Herein, the hard coat layer side was arranged to face the backlight.

The viewing angle was determined and evaluated in the same manner as Example 1. As the same as the result shown in Table 2, the viewing angle increased by 11° with respect to the standard, whereby desired effects were noted. Further, evaluation conditions of the viewing angle were changed to 40° C. and 55% RH, and Polarizing Plate 2 in Example 1 was compared to the polarizing plate of Example 2, prepared as above. The viewing angle in Example 1 resulted 8° as the effect, while the sample of Example 2, provided with the hard coat layer resulted in desired stability against temperature variation of 11°.

Example 3

Using liquid crystal displays employing polarizing plates 2 and 8 of Example 1, the brightness of the display in an oblique direction of 45°, while a white image was displayed, was relatively evaluated.

The orientation property of brightness (luminance) was measured using a spectroradiometer CS-1000A produced by Konica Minolta Sensing, Inc. The sensor of the spectroradiometer CS-1000A was placed on a normal line of a liquid crystal display panel at a certain point which was designated as point A. The sensor was then gradually inclined to 45° direction of the liquid crystal display panel (upward direction of the liquid crystal display panel was designated as 0°), while the sensor was heading to point A and keeping the same distance from point A. The luminance of the liquid crystal display panel was measured at incline angles in the range of 0° to 90°, provided that the incline angle was set to 0° when the sensor was on the normal line of the liquid crystal display panel at point A. An incline angle exhibiting a half luminance of the luminance at incline angle 0° (hereafter referred to as a half-luminance angle) was determined.

As the results, it was found that the half-luminance angle was wider by 8° for Example 8 (40 μm thickness) compared to the half-luminance angle for Example 2 (80 μm thickness). The reason is not still clear, however, it is assumed that minute scattering of light in the cellulose ester film is smaller in the cellulose ester film of 40 μm thickness (Example 8) compared to that in the cellulose ester film of 80 μm thickness (Example 2).

(Possibility for Practical Use)

In the present invention, provided is a liquid crystal display in which a decrease in light utilization efficiency in the oblique direction in the liquid crystal display is minimized and specifically, brightness in the oblique direction is enhanced and the viewing angle is enlarged.

What is claimed is:

1. A liquid crystal display comprising: a brightness enhancing film, polarizing plate (A), a liquid crystal cell, and polarizing plate (B), laminated in that order, wherein:
    (i) polarizing plate (A) comprises a polarizing plate protective film (A1) facing the brightness enhancing film, a polarizing plate protective film (A2) facing the liquid crystal cell, and a polarizer between two polarizing plate protective films (A1) and (A2);
    (ii) the polarizing plate protective film (A1) is a cellulose ester film comprising a material having negative birefringence;
    (iii) an in-plane retardation value Ro(550) of the cellulose ester film represented by Formula (I) is 0 to 5 nm; and
    (iv) a retardation value in a thickness direction Rt(550) of the cellulose ester film represented by Formula (II) is −15 to 15 nm, $$Ro(550)=(Nx-Ny)\times d \quad \text{Formula (I)}$$

$$Rt(550)=\{(Nx+Ny)/2-Nz\}\times d \quad \text{Formula (II)}$$

wherein Nx represents a maximum in-plane refractive index; Ny represents a minimum in-plane refractive index; Nz represents a refractive index in the thickness direction; d represents a thickness of the cellulose ester film (nm); and Ro(550) and Rt(550) each represent a retardation value measured at a wavelength of 550 nm.

2. The liquid crystal display of claim 1, wherein the cellulose ester film exhibits the following retardation values:
    Ro(400) and Ro(700) each are in the range of 0 to 5 nm; and
    Rt(400) and Rt(700) each are in the range of −15 to 15 nm, provided that:
    Ro(400) represents an in-plane retardation value measured at a wavelength of 400 nm;
    Ro(700) represents an in-plane retardation value measured at a wavelength of 700 nm;
    Rt(400) represents a retardation value in the thickness direction measured at a wavelength of 400 nm; and
    Rt(700) represents a retardation value in the thickness direction measured at a wavelength of 700 nm.

3. The liquid crystal display of claim 1, wherein the cellulose ester film comprises:
    (v) a cellulose ester;
    (vi) polymer X, which is a polymer having a molecular weight of 2000 or more but 30000 or less, prepared by copolymerizing:
        Xa, which is an ethylenically unsaturated monomer having neither an aromatic ring nor a hydrophilic group in a molecule, and
        Xb, which is an ethylenically unsaturated monomer having no aromatic ring but having a hydrophilic group in a molecule; and (vii) polymer Y, which is a polymer having a molecular weight of 500 or more but 3000 or less, prepared by polymerizing an ethylenically unsaturated monomer comprising no aromatic ring, wherein a weight average molecular weight of polymer X is larger than a weight average molecular weight of polymer Y.

4. The liquid crystal display of claim 3, wherein polymer X is represented by Formula (1-1), and polymer Y is represented by Formula (2-1):

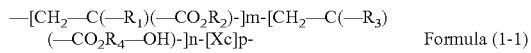
   Formula (1-1)

wherein $R_1$ and $R_3$ each represent H or $CH_3$; $R_2$ represents an alkyl group or a cycloalkyl each having 1-12 carbon atoms; $R_4$ represents —$CH_2$—, —$C_2H_4$— or —$C_3H_6$—; Xc represents a monomer unit polymerizable with —[$CH_2$—C(—$R_1$)(—$CO_2R_2$)—]— and —[$CH_2$—C(—$R_3$)(—$CO_2R_4$—OH)—]—; and m, n and p each indicate a molar ratio, wherein m≠0, n≠0, and m+n+p=100,

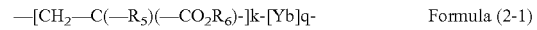   Formula (2-1)

wherein $R_5$ represents H or $CH_3$; $R_6$ represents an alkyl group or a cycloalkyl group each having 1-12 carbon atoms; Yb represents a monomer unit polymerizable with —[$CH_2$—C(—$R_5$)(—$CO_2R_6$)—]—; and k and q each indicate a molar ratio, wherein k≠0, and k+q=100.

5. The liquid crystal display of claim 1, wherein the cellulose ester film has a hard coat film having a thickness of 1-20 pm on a surface of the cellulose ester film facing the brightness enhancing film.

6. The liquid crystal display of claim 1, wherein a thickness of the cellulose ester film is 20-60 μm.

* * * * *